US012775540B1

(12) United States Patent
Jenks et al.

(10) Patent No.: US 12,775,540 B1
(45) Date of Patent: Oct. 27, 2026

(54) CONTROL OF ENVIRONMENTAL IMPACT AND ENERGY COST

(71) Applicant: Tanium Inc., Kirkland, WA (US)

(72) Inventors: Robert A. Jenks, Seattle, WA (US); Keith S. Garner, Mercer Island, WA (US); Oliver Cronk, Hermitage (GB); John W. Stillwell, Chicago, IL (US); Crispin Cowan, Fall City, WA (US)

(73) Assignee: Tanium Inc., Emeryville, CA (US)

( * ) Notice: Subject to any disclaimer, the term of this patent is extended or adjusted under 35 U.S.C. 154(b) by 0 days.

(21) Appl. No.: 18/196,980

(22) Filed: May 12, 2023

Related U.S. Application Data

(60) Provisional application No. 63/342,599, filed on May 16, 2022.

(51) Int. Cl.
*G06F 11/34* (2006.01)
*G06F 11/30* (2006.01)

(52) U.S. Cl.
CPC ...... *G06F 11/3442* (2013.01); *G06F 11/3006* (2013.01); *G06F 11/3062* (2013.01)

(58) Field of Classification Search
USPC .......................................................... 709/224
See application file for complete search history.

(56) References Cited

U.S. PATENT DOCUMENTS 5,220,596 A 6/1993 Patel
5,842,202 A 11/1998 Kon
5,949,755 A 9/1999 Upadhya et al.
6,049,828 A 4/2000 Dev et al.
6,055,545 A 4/2000 Yazaki et al.
6,226,493 B1 5/2001 Leopold et al.
6,615,213 B1 9/2003 Johnson
6,879,979 B2 4/2005 Hindawi et al.
6,885,644 B1 4/2005 Knop et al.
(Continued)

FOREIGN PATENT DOCUMENTS

CN 101933003 B 9/2015
EP 1553747 A1 7/2005
(Continued)

OTHER PUBLICATIONS

Non-Final Office Action, U.S. Appl. No. 15/668,665, Aug. 7, 2019, 11 pages.

(Continued)

*Primary Examiner* — Kevin S Mai
(74) *Attorney, Agent, or Firm* — Nicholson De Vos Webster & Elliott LLP

(57) ABSTRACT

A server system acquires, for each of a sequence of reporting time periods, resource usage information for each of a plurality of respective machines in the collection of machines. The server system determines, for each of the respective machines for each analysis time period in a sequence of analysis time periods, power or environmental cost information based on environmental cost information associated with each respective machine and the acquired resource usage information for one or more of the reporting time periods. Based on the determined power or environmental cost information, the server system causes a remedial operation to be executed for reducing resource usage associated with operations performed by the distributed system.

23 Claims, 8 Drawing Sheets

(56) References Cited

U.S. PATENT DOCUMENTS 6,959,000 B1 10/2005 Lee
7,043,550 B2 5/2006 Knop et al.
7,096,503 B1 8/2006 Magdych et al.
7,111,059 B1 9/2006 Garcea et al.
7,120,693 B2 10/2006 Chang et al.
7,225,243 B1 5/2007 Wilson
7,231,393 B1 6/2007 Harik et al.
7,240,044 B2 7/2007 Chaudhuri et al.
7,299,047 B2 11/2007 Dolan et al.
7,483,430 B1 1/2009 Yuan et al.
7,555,545 B2 6/2009 McCasland
7,600,018 B2 10/2009 Maekawa et al.
7,693,813 B1 4/2010 Cao et al.
7,698,453 B2 4/2010 Samuels et al.
7,702,614 B1 4/2010 Shah et al.
7,720,641 B2 5/2010 Alagappan et al.
7,761,557 B2 7/2010 Fellenstein et al.
7,769,848 B2 8/2010 Choy et al.
7,844,687 B1 11/2010 Gelvin et al.
7,870,613 B2 1/2011 Porter et al.
7,925,655 B1 4/2011 Power et al.
7,962,590 B1 6/2011 Or et al.
8,078,668 B2 12/2011 Moreau
8,086,594 B1 12/2011 Cao et al.
8,086,729 B1 12/2011 Hindawi et al.
8,139,508 B1 3/2012 Roskind
8,166,021 B1 4/2012 Cao et al.
8,166,045 B1 4/2012 Mazumdar et al.
8,185,612 B1 5/2012 Arolovitch et al.
8,185,615 B1 5/2012 Mcdysan et al.
8,271,522 B2 9/2012 Mehul et al.
8,392,530 B1 3/2013 Manapragada et al.
8,477,660 B2 7/2013 Lee et al.
8,504,879 B2 8/2013 Poletto et al.
8,510,562 B2 8/2013 Ramakrishnan et al.
8,650,160 B1 2/2014 Beatty et al.
8,677,448 B1 3/2014 Kauffman et al.
8,682,901 B1 3/2014 Cao et al.
8,813,228 B2 8/2014 Magee et al.
8,819,769 B1 8/2014 Van et al.
8,885,521 B2 11/2014 Wang et al.
8,903,973 B1 12/2014 Hindawi et al.
8,904,039 B1 12/2014 Hindawi et al.
8,972,566 B1 3/2015 Hindawi et al.
9,009,827 B1 4/2015 Albertson et al.
9,059,961 B2 6/2015 Hindawi et al.
9,104,794 B2 8/2015 Zakonov et al.
9,129,028 B2 9/2015 Zhang et al.
9,246,977 B2 1/2016 Hindawi et al.
9,576,131 B2 2/2017 Tuvell et al.
9,609,007 B1 3/2017 Rivlin et al.
9,667,738 B2 5/2017 Hindawi et al.
9,716,649 B2 7/2017 Bent et al.
9,729,429 B2 8/2017 Hindawi et al.
9,769,037 B2 9/2017 Hindawi et al.
9,769,275 B2 9/2017 Hindawi et al.
9,800,603 B1 10/2017 Sidagni
9,910,752 B2 3/2018 Lippincott et al.
9,973,525 B1 5/2018 Roturier et al.
9,985,982 B1 5/2018 Bartos et al.
9,998,955 B1 6/2018 Maccarthaigh
10,015,185 B1 7/2018 Kolman et al.
10,095,864 B2 10/2018 Hunt et al.
10,111,208 B2 10/2018 Hindawi et al.
10,136,415 B2 11/2018 Hindawi et al.
10,148,536 B2 12/2018 Hindawi et al.
10,261,770 B2 4/2019 Devagupthapu et al.
10,360,093 B2 7/2019 Rahman et al.
10,372,904 B2 8/2019 Hunt et al.
10,412,188 B2 9/2019 Hindawi et al.
10,482,242 B2 11/2019 Hunt et al.
10,484,429 B1 11/2019 Fawcett et al.
10,498,744 B2 12/2019 Hunt et al.
10,649,870 B1 5/2020 Lippincott et al.
10,674,486 B2 6/2020 Hindawi et al.
10,708,116 B2 7/2020 Hindawi et al.
10,795,906 B1 10/2020 Teubner
10,824,729 B2 11/2020 Hoscheit et al.
10,841,365 B2 11/2020 White et al.
10,873,645 B2 12/2020 Freilich et al.
10,929,345 B2 2/2021 Stoddard et al.
11,032,298 B1 6/2021 Robbins et al.
11,100,199 B2 8/2021 Subramaniam
11,151,246 B2 10/2021 Davis et al.
11,153,383 B2 10/2021 Richards et al.
11,172,470 B1 11/2021 Guieu et al.
11,258,654 B1 2/2022 Hindawi et al.
11,262,990 B2 3/2022 Parthasarathy et al.
11,277,489 B2 3/2022 Freilich et al.
11,301,568 B1 4/2022 Dargude et al.
11,343,355 B1 5/2022 Goela et al.
11,372,938 B1 6/2022 Stoddard et al.
11,461,208 B1 10/2022 Lippincott et al.
11,563,764 B1 1/2023 Hoscheit et al.
11,609,835 B1 3/2023 Varga et al.
11,700,303 B1 7/2023 Richards et al.
11,711,810 B1 7/2023 Guieu et al.
11,777,981 B1 10/2023 Hoscheit et al.
11,809,294 B1 11/2023 Lippincott et al.
11,831,670 B1 11/2023 Molls et al.
11,886,229 B1 1/2024 Goela et al.
11,914,495 B1 2/2024 Varga et al.
11,956,335 B1 4/2024 Goela et al.
12,071,262 B2 8/2024 Turner et al.
12,229,032 B1 2/2025 Varga et al.
2001/0056461 A1 12/2001 Kampe et al.
2002/0007404 A1 1/2002 Vange et al.
2002/0042693 A1 4/2002 Kampe et al.
2002/0073086 A1 6/2002 Thompson et al.
2002/0099952 A1 7/2002 Lambert et al.
2002/0198867 A1 12/2002 Lohman et al.
2003/0008712 A1 1/2003 Poulin
2003/0101253 A1 5/2003 Saito et al.
2003/0120603 A1 6/2003 Kojima et al.
2003/0131044 A1 7/2003 Nagendra et al.
2003/0212676 A1 11/2003 Bruce et al.
2003/0212821 A1 11/2003 Gillies et al.
2004/0037374 A1 2/2004 Gonikberg
2004/0044727 A1 3/2004 Abdelaziz et al.
2004/0044790 A1 3/2004 Loach et al.
2004/0054723 A1 3/2004 Dayal et al.
2004/0054889 A1 3/2004 Pitsos
2004/0064522 A1 4/2004 Zhang et al.
2004/0076164 A1 4/2004 Vanderveen et al.
2004/0190085 A1 9/2004 Silverbrook et al.
2005/0004907 A1 1/2005 Bruno et al.
2005/0053000 A1 3/2005 Oliver et al.
2005/0108356 A1 5/2005 Rosu et al.
2005/0108389 A1 5/2005 Kempin et al.
2005/0195755 A1 9/2005 Senta et al.
2006/0039371 A1 2/2006 Castro et al.
2006/0128406 A1 6/2006 Macartney
2006/0133274 A1 6/2006 Lee et al.
2006/0282505 A1 12/2006 Hasha et al.
2007/0005738 A1 1/2007 Alexion-Tiernan et al.
2007/0083617 A1 4/2007 Chakrabarti et al.
2007/0171844 A1 7/2007 Loyd et al.
2007/0211651 A1 9/2007 Ahmed et al.
2007/0230482 A1 10/2007 Shim et al.
2007/0261051 A1 11/2007 Porter et al.
2008/0049631 A1 2/2008 Morrill
2008/0082628 A1 4/2008 Rowstron et al.
2008/0133582 A1 6/2008 Andersch et al.
2008/0258880 A1 10/2008 Smith et al.
2008/0263031 A1 10/2008 George et al.
2008/0288646 A1 11/2008 Hasha et al.
2008/0301256 A1 12/2008 Mcwilliams et al.
2009/0125639 A1 5/2009 Dam et al.
2009/0259518 A1 10/2009 Harvey et al.
2009/0271360 A1 10/2009 Bestgen et al.
2009/0285204 A1 11/2009 Gallant et al.
2009/0319503 A1 12/2009 Mehul et al.
2009/0328115 A1 12/2009 Malik
2010/0011060 A1 1/2010 Hilterbrand et al.

(56) References Cited

U.S. PATENT DOCUMENTS

2010/0070570 A1 3/2010 Lepeska
2010/0085948 A1 4/2010 Yu et al.
2010/0094862 A1 4/2010 Bent et al.
2010/0154026 A1 6/2010 Chatterjee et al.
2010/0260178 A1 10/2010 Huang et al.
2010/0296416 A1 11/2010 Lee et al.
2010/0306252 A1 12/2010 Jarvis et al.
2011/0099562 A1 4/2011 Nandy et al.
2011/0138312 A1 6/2011 Yeh et al.
2011/0231431 A1 9/2011 Kamiwada et al.
2011/0271319 A1 11/2011 Venable, Sr.
2011/0299455 A1* 12/2011 Ordentlich .............. H04L 67/12 370/328
2012/0053957 A1 3/2012 Atkins et al.
2012/0110183 A1 5/2012 Miranda et al.
2012/0221692 A1 8/2012 Steiner et al.
2012/0269096 A1 10/2012 Roskind
2012/0330700 A1 12/2012 Garg et al.
2013/0110931 A1 5/2013 Kim et al.
2013/0170336 A1 7/2013 Chen et al.
2013/0212296 A1 8/2013 Goel et al.
2013/0276053 A1 10/2013 Hugard et al.
2013/0326494 A1 12/2013 Nunez
2014/0075505 A1 3/2014 Subramanian
2014/0101133 A1 4/2014 Carston et al.
2014/0149557 A1 5/2014 Lohmar et al.
2014/0164290 A1 6/2014 Salter
2014/0164552 A1 6/2014 Kim et al.
2014/0181247 A1 6/2014 Hindawi et al.
2014/0181295 A1 6/2014 Hindawi et al.
2014/0244727 A1 8/2014 Kang et al.
2014/0279044 A1 9/2014 Summers et al.
2014/0280280 A1 9/2014 Singh
2014/0282586 A1 9/2014 Shear et al.
2014/0372533 A1 12/2014 Fu et al.
2014/0375528 A1 12/2014 Ling
2015/0058619 A1 2/2015 Sweet et al.
2015/0080039 A1 3/2015 Ling et al.
2015/0149624 A1 5/2015 Hindawi et al.
2015/0163121 A1 6/2015 Mahaffey et al.
2015/0172228 A1 6/2015 Zalepa et al.
2015/0199511 A1 7/2015 Faile et al.
2015/0199629 A1 7/2015 Faile et al.
2015/0256575 A1 9/2015 Scott
2015/0302458 A1 10/2015 Dides et al.
2015/0312335 A1 10/2015 Ying et al.
2015/0372911 A1 12/2015 Yabusaki et al.
2015/0373043 A1 12/2015 Wang et al.
2015/0378743 A1 12/2015 Zellermayer et al.
2016/0034692 A1 2/2016 Singler
2016/0080408 A1 3/2016 Coleman et al.
2016/0119251 A1 4/2016 Solis et al.
2016/0255142 A1 9/2016 Hunt et al.
2016/0255143 A1 9/2016 Hunt et al.
2016/0269434 A1 9/2016 Divalentin et al.
2016/0286540 A1 9/2016 Hindawi et al.
2016/0352588 A1 12/2016 Subbarayan et al.
2016/0360006 A1 12/2016 Hopkins et al.
2016/0378450 A1 12/2016 Fu et al.
2017/0093915 A1* 3/2017 Ellis ........................ H04L 63/20
2017/0118074 A1 4/2017 Feinstein et al.
2017/0133843 A1* 5/2017 Mcneill-Mccallum ...................... H02J 13/0005
2017/0257432 A1 9/2017 Fu et al.
2017/0286690 A1 10/2017 Chari et al.
2017/0346824 A1 11/2017 Mahabir et al.
2018/0013768 A1 1/2018 Hunt et al.
2018/0039486 A1 2/2018 Kulkarni et al.
2018/0074483 A1 3/2018 Cruz
2018/0074796 A1 3/2018 Alabes et al.
2018/0191747 A1 7/2018 Nachenberg et al.
2018/0191766 A1 7/2018 Holeman et al.
2018/0267794 A1 9/2018 Atchison et al.
2018/0270127 A1 9/2018 Pang et al.
2018/0321961 A1 11/2018 Gunda et al.
2018/0351792 A1 12/2018 Hunter et al.
2018/0351793 A1 12/2018 Hunter et al.
2018/0375892 A1 12/2018 Ganor
2019/0034478 A1* 1/2019 Dolbear .............. G06F 16/2379
2019/0081981 A1 3/2019 Bansal
2019/0096217 A1 3/2019 Pourmohammad et al.
2019/0138512 A1 5/2019 Pourmohammad et al.
2019/0260638 A1 8/2019 Yocam et al.
2019/0280867 A1 9/2019 Kurian
2019/0319987 A1 10/2019 Levy et al.
2019/0361843 A1 11/2019 Stoddard et al.
2020/0028890 A1 1/2020 White et al.
2020/0053072 A1 2/2020 Glozman et al.
2020/0195693 A1 6/2020 Price et al.
2020/0198867 A1 6/2020 Nakamichi
2020/0202007 A1 6/2020 Nagaraja et al.
2020/0304536 A1 9/2020 Mahabir et al.
2021/0027401 A1* 1/2021 Hovhannisyan ..... G06Q 50/163
2021/0218711 A1 7/2021 Biran et al.
2021/0373861 A1 12/2021 Parthasarathy et al.
2022/0272084 A1 8/2022 Hyatt
2023/0036694 A1 2/2023 Steven
2023/0058040 A1 2/2023 Nevius et al.
2023/0360040 A1 11/2023 Childe et al.

FOREIGN PATENT DOCUMENTS

EP 2493118 A1 8/2012
JP 2007-279978 A 10/2007
WO 2004/010298 A1 1/2004

OTHER PUBLICATIONS

Non-Final Office Action, U.S. Appl. No. 15/702,617, Jun. 1, 2018, 37 pages.
Non-Final Office Action, U.S. Appl. No. 16/443,720, Sep. 4, 2020, 13 pages.
Non-Final Office Action, U.S. Appl. No. 16/870,742, Oct. 28, 2021, 7 pages.
Non-Final Office Action, U.S. Appl. No. 16/917,800, Jul. 1, 2021, 7 pages.
Non-Final Office Action, U.S. Appl. No. 16/943,291, Jul. 16, 2021, 19 pages.
Non-Final Office Action, U.S. Appl. No. 16/943,307, Apr. 27, 2022, 7 pages.
Non-Final Office Action, U.S. Appl. No. 16/952,009, Aug. 1, 2022, 8 pages.
Non-Final Office Action, U.S. Appl. No. 17/001,586, Jun. 9, 2022, 7 pages.
Non-Final Office Action, U.S. Appl. No. 17/129,638, Jul. 23, 2021, 7 pages.
Non-Final Office Action, U.S. Appl. No. 17/182,083, Apr. 27, 2023, 7 pages.
Non-Final Office Action, U.S. Appl. No. 17/503,023, Nov. 25, 2022, 7 pages.
Non-Final Office Action, U.S. Appl. No. 17/521,686, Oct. 4, 2022, 38 pages.
Non-Final Office Action, U.S. Appl. No. 17/732,402, May 21, 2024, 20 pages.
Non-Final Office Action, U.S. Appl. No. 17/751,504, Jun. 9, 2023, 31 pages.
Non-Final Office Action, U.S. Appl. No. 17/856,787, Apr. 11, 2024, 21 pages.
Non-Final Office Action, U.S. Appl. No. 18/123,930, Jul. 14, 2023, 7 pages.
Non-Final Office Action, U.S. Appl. No. 18/204,351, Jan. 5, 2024, 8 pages.
Non-Final Office Action, U.S. Appl. No. 18/225,620, Mar. 14, 2024, 14 pages.
Notice of Allowability, U.S. Appl. No. 17/751,504, Dec. 18, 2023, 11 pages.
Notice of Allowance, U.S. Appl. No. 12/412,623, Oct. 5, 2011, 5 pages.

(56) References Cited

OTHER PUBLICATIONS

Notice of Allowance, U.S. Appl. No. 13/084,923, Jul. 30, 2014, 7 pages.
Notice of Allowance, U.S. Appl. No. 13/107,625, Apr. 23, 2014, 7 pages.
Notice of Allowance, U.S. Appl. No. 13/107,625, Oct. 22, 2014, 7 pages.
Notice of Allowance, U.S. Appl. No. 13/301,250, Jan. 21, 2014, 10 pages.
Notice of Allowance, U.S. Appl. No. 13/301,250, Oct. 24, 2014, 8 pages.
Notice of Allowance, U.S. Appl. No. 13/797,946, Sep. 11, 2015, 18 pages.
Notice of Allowance, U.S. Appl. No. 13/797,962, Feb. 17, 2015, 10 pages.
Notice of Allowance, U.S. Appl. No. 14/530,601, Apr. 5, 2017, 8 pages.
Notice of Allowance, U.S. Appl. No. 14/553,769, May 19, 2017, 6 pages.
Notice of Allowance, U.S. Appl. No. 14/554,711, Jan. 27, 2017, 22 pages.
Notice of Allowance, U.S. Appl. No. 14/554,739, May 9, 2017, 20 pages.
Notice of Allowance, U.S. Appl. No. 15/004,757, Jul. 16, 2018, 7 pages.
Notice of Allowance, U.S. Appl. No. 15/136,790, Nov. 20, 2017, 11 pages.
Notice of Allowance, U.S. Appl. No. 15/174,850, Jun. 20, 2018, 39 pages.
Notice of Allowance, U.S. Appl. No. 15/215,468, Apr. 1, 2019, 8 pages.
Notice of Allowance, U.S. Appl. No. 15/215,468, Jan. 24, 2019, 8 pages.
Notice of Allowance, U.S. Appl. No. 15/215,474, Jul. 11, 2019, 9 pages.
Notice of Allowance, U.S. Appl. No. 15/215,483, Jun. 7, 2018, 9 pages.
Notice of Allowance, U.S. Appl. No. 15/668,665, Mar. 2, 2020, 7 pages.
Notice of Allowance, U.S. Appl. No. 15/686,054, Jul. 18, 2018, 6 pages.
Notice of Allowance, U.S. Appl. No. 15/702,617, Apr. 23, 2019, 24 pages.
Notice of Allowance, U.S. Appl. No. 15/713,518, Apr. 10, 2019, 14 pages.
Notice of Allowance, U.S. Appl. No. 15/713,518, Jul. 29, 2019, 13 pages.
Notice of Allowance, U.S. Appl. No. 15/878,286, Apr. 25, 2019, 11 pages.
Notice of Allowance, U.S. Appl. No. 15/878,286, Jan. 10, 2020, 6 pages.
Notice of Allowance, U.S. Appl. No. 15/878,286, Jul. 31, 2019, 5 pages.
Notice of Allowance, U.S. Appl. No. 15/930,342, Mar. 24, 2022, 8 pages.
Notice of Allowance, U.S. Appl. No. 15/930,342, May 25, 2022, 9 pages.
Notice of Allowance, U.S. App. No. 16/033,131, Jun. 30, 2020, 27 pages.
Notice of Allowance, U.S. Appl. No. 16/194,240, Aug. 14, 2019, 10 pages.
Notice of Allowance, U.S. Appl. No. 16/194,240, Mar. 2, 2020, 9 pages.
Notice of Allowance, U.S. Appl. No. 16/194,240, Nov. 7, 2019, 10 pages.
Notice of Allowance, U.S. Appl. No. 16/430,336, Aug. 7, 2020, 28 pages.
Notice of Allowance, U.S. Appl. No. 16/430,336, Sep. 3, 2020, 5 pages.
Notice of Allowance, U.S. Appl. No. 16/443,720, Feb. 9, 2021, 8 pages.
Notice of Allowance, U.S. Appl. No. 16/443,720, Jun. 15, 2021, 7 pages.
Notice of Allowance, U.S. Appl. No. 16/532,391, Oct. 21, 2020, 10 pages.
Notice of Allowance, U.S. Appl. No. 16/565,247, Aug. 17, 2020, 19 pages.
Notice of Allowance, U.S. Appl. No. 16/854,844, Jul. 6, 2021, 16 pages.
Notice of Allowance, U.S. Appl. No. 16/870,742, Mar. 7, 2022, 10 pages.
Notice of Allowance, U.S. Appl. No. 16/917,800, Oct. 15, 2021, 7 pages.
Notice of Allowance, U.S. Appl. No. 16/943,291, Jan. 27, 2022, 12 pages.
Notice of Allowance, U.S. Appl. No. 16/943,291, Oct. 1, 2021, 11 pages.
Notice of Allowance, U.S. Appl. No. 16/943,307, Nov. 8, 2022, 11 pages.
Notice of Allowance, U.S. Appl. No. 16/943,307, Oct. 6, 2022, 12 pages.
Notice of Allowance, U.S. Appl. No. 16/952,009, Jul. 25, 2023, 8 pages.
Notice of Allowance, U.S. Appl. No. 16/952,009, Mar. 28, 2023, 8 pages.
Notice of Allowance, U.S. Appl. No. 17/001,586, Sep. 8, 2022, 8 pages.
Notice of Allowance, U.S. Appl. No. 17/129,638, Nov. 4, 2021, 9 pages.
Notice of Allowance, U.S. Appl. No. 17/182,083, Sep. 20, 2023, 8 pages.
Notice of Allowance, U.S. Appl. No. 17/503,023, Feb. 24, 2023, 8 pages.
Notice of Allowance, U.S. Appl. No. 17/521,686, Mar. 3, 2023, 8 pages.
Notice of Allowance, U.S. Appl. No. 17/751,504, Nov. 21, 2023, 12 pages.
Notice of Allowance, U.S. App. No. 17/959,177, Jun. 21, 2023, 9 pages.
Notice of Allowance, U.S. App. No. 17/959,177, Mar. 28, 2023, 9 pages.
Notice of Allowance, U.S. Appl. No. 18/099,854, May 26, 2023, 12 pages.
Notice of Allowance, U.S. Appl. No. 18/123,930, Nov. 7, 2023, 11 pages.
Peter Kairouz et al., "Advances and Open Problems in Federated Learning," 2021, 121 pages, arXIV:1912.04977v3.
Ping Wang et al., "Peer-to-Peer Botnets: The Next Generation of Botnet Attacks", Jan. 2010, pp. 1-25 (Year: 2010).
Requirement for Restriction/Election, U.S. Appl. No. 12/412,623, Nov. 22, 2010, 5 pages.
Requirement for Restriction/Election, U.S. Appl. No. 13/107,625, Oct. 11, 2013, 6 pages.
Sean Rhea et al., "Handling Churn in a DHT", 2004, pp. 1-14 (Year: 2004).
Stoica et al., "Chord: A Scalable Peer-to-Peer Lookup Service for Internet Applications", 2001, pp. 1-12 (Year: 2002).
Supplemental Notice of Allowability, U.S. Appl. No. 16/443,720, Aug. 4, 2021, 2 pages.
Supplemental Notice of Allowability, U.S. Appl. No. 16/870,742, Apr. 11, 2022, 2 pages.
Trevor Hastie et al., "The Elements of Statistical Learning, Data Mining, Inference, and Prediction," 2001, 545 pages, Springer.
Trevor Hastie et al., "The Elements of Statistical Learning, Data Mining, Inference, and Prediction," 2008, 764 pages, Second Edition, Springer.
Weixiong Rao et al., "Optimal Resource Placement in Structured Peer-to-Peer Networks," IEEE Transactions on Parallel and Distributed Systems, vol. 21, No. 7, Jul. 2010, 16 pgs.
"Total Carbon Accounting: A Framework to Deliver Locational Carbon Intensity Data", White Paper, Nov. 2021, 29 pages.

(56) References Cited

OTHER PUBLICATIONS

Abdalkarim Awad et al., "Virtual Cord Protocol (VCP): A Flexible DHT-like Routing Service for Sensor Networks", In Proceedings of the 5th IEEE International Conference on Mobile Ad Hoc and Sensor Systems, 2008, 10 DQ:S. 133-142.
Corrected Notice of Allowability, U.S. Appl. No. 15/004,757, Aug. 24, 2018, 4 pages.
Corrected Notice of Allowability, U.S. Appl. No. 15/174,850, Jul. 25, 2018, 37 pages.
Corrected Notice of Allowability, U.S. Appl. No. 16/194,240, Mar. 31, 2020, 6 pages.
Corrected Notice of Allowability, U.S. Appl. No. 16/430,336, Oct. 15, 2020, 2 pages.
Corrected Notice of Allowability, U.S. Appl. No. 16/565,247, Oct. 15, 2020, 10 pages.
Corrected Notice of Allowability, U.S. Appl. No. 16/917,800, Dec. 16, 2021, 2 pages.
Corrected Notice of Allowability, U.S. Appl. No. 16/917,800, Nov. 18, 2021, 2 pages.
Corrected Notice of Allowability, U.S. Appl. No. 16/917,800, Oct. 25, 2021, 2 pages.
Corrected Notice of Allowability, U.S. Appl. No. 16/943,291, Apr. 11, 2022, 2 pages.
Corrected Notice of Allowability, U.S. Appl. No. 16/943,291, Feb. 25, 2022, 2 pages.
Corrected Notice of Allowability, U.S. Appl. No. 16/943,291, Oct. 18, 2021, 5 pages.
Corrected Notice of Allowability, U.S. Appl. No. 18/099,854, Jun. 5, 2023, 7 pages.
Final Office Action, U.S. Appl. No. 13/084,923, Jul. 1, 2013, 10 pages.
Final Office Action, U.S. Appl. No. 15/004,757, Dec. 29, 2017, 27 pages.
Final Office Action, U.S. Appl. No. 15/215,474, Apr. 1, 2019, 7 pages.
Final Office Action, U.S. Appl. No. 15/668,665, Dec. 10, 2019, 13 pages.
Final Office Action, U.S. Appl. No. 15/702,617, Dec. 27, 2018, 54 pages.
Final Office Action, U.S. Appl. No. 16/952,009, Dec. 13, 2022, 9 pages.
H. Brendan Mcmahan et al., "Communication-Efficient Learning of Deep Networks from Decentralized Data," 2017, 10 pages, Proceedings of the 20th International Conference on Artificial Intelligence and Statistics (AISTATS), Fort Lauderdale, Florida, USA.
Hood, Cynthhia S., Proactive Network-Fault Detection, Sep. 1997, IEEE Transactions on Reliability, vol. 46, No. 3, pp. 333-341.
Ian Goodfellow et al., "Deep Learning," 2016, 798 pages, MIT Press.
International Preliminary Report on Patentability, PCT App. No. PCT/US2013/076971, Jul. 2, 2015, 15 pages.
International Preliminary Report on Patentability, PCT App. No. PCT/US2014/067607, Jun. 9, 2016, 11 pages.
International Preliminary Report on Patentability, PCT App. No. PCT/US2015/020780, Oct. 6, 2016, 10 pages.
International Search Report and Written Opinion, PCT App. No. PCT/US2013/076971, Apr. 4, 2014, 17 pages.
International Search Report and Written Opinion, PCT App. No. PCT/US2014/067607, Feb. 18, 2015, 13 pages.
International Search Report and Written Opinion, PCT App. No. PCT/US2015/020780, Jul. 2, 2015, 13 pages.
IT Services, "Environmental impact of IT: desktops, laptops and screens", How we are reducing IT waste, and steps you can take to reduce your carbon footprint, available online at <https://www.it.ox.ac.uk/article/environment-and-it>, Apr. 13, 2022, 5 pages.
Jae Woo Lee et al., "0 to 10k in 20 Seconds: Bootstrapping Large-Scale DHT Networks", 2011 IEEE International Conference on Communications, Jun. 9, 2011, pp. 1-6.
Justin Sutton-Parker, "Can analytics software measure end user computing electricity consumption?", Springer, May 5, 2022, 19 pages.
Justin Sutton-Parker, "Determining commuting greenhouse gas emissions abatement achieved by information technology enabled remote working", The 11th International Conference on Sustainable Energy Information Technology (SEIT), Aug. 9-12, 2021, 9 pages.
Justin Sutton-Parker, Determining end user computing device Scope 2 GHG emissions with accurate use phase energy consumption measurement, The 10th International Conference on Sustainable Energy Information Technology (SEIT), Aug. 9-12, 2020, pp. 484-491.
Justin Sutton-Parker, "Quantifying greenhouse gas abatement delivered by alternative computer operating system displacement strategies", The 12th International Conference on Sustainable Energy Information Technology, Aug. 9-11, 2022, pp. 1-10.
Mongeau et al., "Ensuring integrity of network inventory and configuration data", Telecommunications Network Strategy and Planning Symposium, Networks 2004, 11th International Vienna, Austria, Jun. 13-16, 2004, 6 pgs.
Non-Final Office Action, U.S. Appl. No. 12/412,623, Mar. 7, 2011, 10 pages.
Non-Final Office Action, U.S. Appl. No. 13/084,923, Dec. 9, 2013, 13 pages.
Non-Final Office Action, U.S. Appl. No. 13/084,923, Feb. 14, 2013, 8 pages.
Non-Final Office Action, U.S. Appl. No. 13/107,625, Jan. 14, 2014, 9 pages.
Non-Final Office Action, U.S. Appl. No. 13/301,250, Jun. 26, 2013, 11 pages.
Non-Final Office Action, U.S. Appl. No. 13/797,946, Feb. 27, 2015, 18 pages.
Non-Final Office Action, U.S. Appl. No. 14/530,601, Nov. 10, 2016, 8 pages.
Non-Final Office Action, U.S. Appl. No. 14/553,769, Feb. 9, 2017, 16 pages.
Non-Final Office Action, U.S. Appl. No. 14/554,711, Jul. 29, 2016, 23 pages.
Non-Final Office Action, U.S. Appl. No. 14/554,739, Aug. 26, 2016, 30 pages.
Non-Final Office Action, U.S. Appl. No. 15/004,757, Jun. 21, 2017, 23 pages.
Non-Final Office Action, U.S. Appl. No. 15/004,757, Mar. 9, 2018, 57 pages.
Non-Final Office Action, U.S. Appl. No. 15/215,468, Oct. 4, 2018, 13 pages.
Non-Final Office Action, U.S. Appl. No. 15/215,474, Sep. 10, 2018, 10 pages.
Corrected Notice of Allowability, U.S. Appl. No. 17/683,213, Oct. 7, 2024, 2 pages.
Corrected Notice of Allowability, U.S. Appl. No. 17/683,213, Sep. 26, 2024, 2 pages.
Corrected Notice of Allowability, U.S. Appl. No. 18/225,620, Oct. 15, 2024, 2 pages.
Final Office Action, U.S. Appl. No. 17/732,402, Nov. 6, 2024, 21 pages.
Non-Final Office Action, U.S. Appl. No. 18/374,621, Aug. 16, 2024, 9 pages.
Non-Final Office Action, U.S. Appl. No. 18/440,922, Sep. 5, 2024, 14 pages.
Non-Final Office Action, U.S. Appl. No. 18/516,882, Aug. 28, 2024, 11 pages.
Notice of Allowance, U.S. Appl. No. 17/683,213, Sep. 16, 2024, 18 pages.
Notice of Allowance, U.S. Appl. No. 18/204,351, Jun. 21, 2024, 10 pages.
Notice of Allowance, U.S. Appl. No. 18/225,620, Jul. 18, 2024, 7 pages.
Notice of Allowance, U.S. Appl. No. 18/374,621, Oct. 30, 2024, 7 pages.
Notice of Allowance, U.S. Appl. No. 18/440,922, Oct. 29, 2024, 11 pages.

(56) References Cited

OTHER PUBLICATIONS

Supplemental Notice of Allowability, U.S. Appl. No. 18/204,351, Oct. 1, 2024, 2 pages.
Corrected Notice of Allowance, U.S. Appl. No. 18/516,882, Dec. 20, 2024, 5 pages.
Non-Final Office Action, U.S. Appl. No. 18/421,881, Mar. 21, 2025, 15 pages.
Notice of Allowance, U.S. Appl. No. 17/675,998, Jan. 22, 2025, 10 pages.
Notice of Allowance, U.S. Appl. No. 17/856,787, Nov. 18, 2024, 10 pages.
Notice of Allowance, U.S. Appl. No. 18/516,882, Dec. 18, 2024, 8 pages.
Final Office Action, U.S. Appl. No. 18/421,881, Aug. 13, 2025, 15 pages.
Non-Final Office Action, U.S. Appl. No. 18/604,488, Jul. 10, 2025, 14 pages.
Non-Final Office Action, U.S. App. No. 19/031,160, Sep. 10, 2025, 9 pages.
Corrected Notice of Allowance, U.S. Appl. No. 17/675,998, May 5, 2025, 2 pages.
Notice of Allowance, U.S. Appl. No. 17/683,213, Apr. 9, 2025, 18 pages.
Advisory Action, U.S. Appl. No. 18/421,881, Oct. 1, 2025, 3 pages.
Notice of Allowance, U.S. Appl. No. 18/604,488, Nov. 20, 2025, 13 pages.
Notice of Allowance, U.S. App. No. 19/031,160, Jan. 21, 2025, 11 pages.

* cited by examiner

Load C4

| | Operating System | Application 1 | Application 2 | Application 3 | Components | Aggregate (Machine) | Aggregate (Regional) |
|---|---|---|---|---|---|---|---|
| Energy Cost 300 | 1.4 | 0.8 | 0.65 | 5.1 | 2.1 | 7.95 | 47.7 |
| Environmental Cost 302 | 2.2 | 1.4 | 0.9 | 7.6 | 3.1 | 12.1 | 72.6 |
| Environmental Cost 304 | 0.8 | 1.3 | 0.86 | 0.75 | 0.85 | 3.71 | 23.2 |

Figure 3A

Components of Machine 102a

310

| | Component 1 | Component 2 | Component 3 | Component 4 |
|---|---|---|---|---|
| Idle State (time) | 1.4 | 0.8 | 1.4 | 0.8 |
| Non-idle state A (time) | 2.2 | N/A | 2.2 | 1.4 |
| Non-idle state B (time) | 0.8 | 1.3 | N/A | N/A |
| Non-idle state C (time) | 0.8 | 1.3 | 0.0 | N/A |

312

| | | | | |
|---|---|---|---|---|
| Power Consumption Rate - Idle | 0.05 | 0.07 | 0.02 | 0.04 |
| Power Consumption Rate – State A | 0.6 | N/A | 0.4 | 1.3 |
| Power Consumption Rate – State B | 0.6 | 0.7 | N/A | N/A |
| Power Consumption Rate – State C | 0.9 | 0.4 | 0.8 | N/A |

Figure 3B

CONTROL OF ENVIRONMENTAL IMPACT AND ENERGY COST

RELATED APPLICATIONS

This application claims priority to U.S. Provisional Application Ser. No. 63/342,599, filed May 16, 2022, which is hereby incorporated by reference in its entirety.

This application is related to U.S. patent application Ser. No. 17/001,586, filed Aug. 24, 2020, now U.S. Pat. No. 11,5663,764, which is hereby incorporated by reference in its entirety.

This application is related to U.S. patent application Ser. No. 16/033,131, filed Jul. 11, 2018, now U.S. Pat. No. 10,824,729, which claims priority to U.S. Provisional Application No. 62/532,918, filed Jul. 14, 2017, each of which is hereby incorporated by reference in its entirety.

This application is related to U.S. patent application Ser. No. 14/554,739, filed Nov. 26, 2014, now U.S. Pat. No. 9,769,275, which claims priority to U.S. Provisional Application No. 61/969,711, filed Mar. 24, 2014, each of which is hereby incorporated by reference in its entirety.

This application is related to U.S. patent application Ser. No. 14/554,711, filed Nov. 26, 2014, now U.S. Pat. No. 9,667,738, which claims priority to U.S. Provisional Application No. 61/969,708, filed Mar. 24, 2014, each which is hereby incorporated by reference in its entirety.

This application is related to U.S. patent application Ser. No. 13/797,962, filed Mar. 12, 2013, now U.S. Pat. No. 9,059,961, U.S. Provisional Application Ser. No. 61/745,236, filed Dec. 21, 2012, and U.S. Provisional Application Ser. No. 61/774,106, filed Mar. 7, 2013, the entireties of which are hereby incorporated by reference.

This application is also related to U.S. patent application Ser. No. 12/412,623, filed Mar. 27, 2009, now U.S. Pat. No. 8,086,729, U.S. patent application Ser. No. 13/084,923, filed Apr. 12, 2011, now U.S. Pat. No. 8,904,039, and U.S. patent application Ser. No. 13/107,625, filed May 13, 2011, now U.S. Pat. No. 8,903,973. Content of each of the above applications is hereby incorporated by reference in its entirety.

This application is related to U.S. patent application Ser. No. 16/952,009, filed Nov. 18, 2020, and U.S. Provisional Patent Application Ser. No. 62/937,125, filed Nov. 18, 2019, the entireties of which are hereby incorporated by reference.

BACKGROUND

There are many circumstances in which multiple computational machines (e.g., computers, servers, and other machines) on the same local area network (LAN), located in a particular geographic area, need to execute tasks that create a high compute load on particular machines, or groups of machines at a particular location. It would be beneficial to have a mechanism for efficiently and dynamically distributing loads across different machines.

In large networks, and the networks of machines/computers used by large organizations, the numbers of managed machines can number in the tens or hundreds of thousands, or even more. Conventional methods typically do not have access to real-time reporting on the energy usage of each machine, nor do they provide the ability to implement controls over energy usage. For example, monitoring use of such computers or machines, sometimes herein called endpoints, using an electric meter at the grid connection for a data center does not provide granular data about individual machines. In a further example, monitoring at the line connection for an endpoint does not provide granular data about what computing processes are consuming energy. Under some traditional approaches, energy estimates are determined based on the number and type of the endpoints, but do not take into account real-time energy measurements. Traditional approaches also fail to provide the ability to determine environmental footprint data (e.g., $CO_2$ output, electricity cost, electricity source) in real-time at a granular level. Accordingly, the compute load, financial cost, and environmental cost of respective machines and their constituent software processes is not monitored in real time and cannot be altered in real-time so as to improve performance with respect to one or more performance metrics, such as system-wide energy usage, and/or environmental impact, and/or one or more metrics that represent predefined combinations of energy usage and environmental impact. Traditional approaches are also unable to implement control over loads such as time-shifting and location-shifting in reaction to requests from energy providers, or in response to other external signals.

SUMMARY

In one aspect, a method is performed at a server system. The server system acquires, for each of a sequence of reporting time periods, resource usage information for each of a plurality of respective machines in a distributed system (e.g., a system that includes a collection of machines and the server system), the resource usage information for a respective time period in the sequence of reporting time periods comprising information identifying resource usage by the respective machine during a respective time period, based at least in part on one or more of power consumption, computing processes executed, CPU usage, CPU cores in use, or memory usage during the respective time period. The server system determines, for each of the respective machines for each analysis time period in a sequence of analysis time periods, power usage and/or environmental impact information based on environmental cost information (sometimes called environmental impact information) associated with each respective machine and the acquired resource usage information for one or more of the reporting time periods. The server system, based on the determined power or environmental cost information, may present a plurality of candidate remedial operations. The plurality of candidate remedial operations include one or more remedial operations (e.g., user-selectable remedial operations and/or automatically selected remedial operations) for reducing environmental costs associated with operations performed by the distributed system. The server system, in response to receiving user selection of a respective remedial operation, performs or initiates performance of the remedial operation.

In another aspect of the invention, a non-transitory computer-readable medium, having instructions stored thereon, which when executed by one or more processors of a server system cause the server system to perform operations implementing any of the server-side methods described herein.

In another aspect of the invention, a server system includes one or more communication interfaces for communicatively coupling the server system to respective machines in a collection of machines, one or more processors, and memory storing one or more programs, the one or more programs including instructions, which when executed by the one or more processors cause the server system to perform operations implementing any of the server-side methods described herein.

In yet another aspect of the invention, a method is performed by a distributed system that includes a server system and N respective machines in a collection of machines, where Nis an integer greater than 2. The method includes, at each respective machine of the N respective machines, during each of a sequence of reporting time periods, collecting and locally storing resource usage information, the resource usage information for a respective time period in the sequence of reporting time periods comprising information identifying resource usage by the respective machine during a respective time period, including one or more of power consumption during the respective time period and/or one or more of processes executed, and CPU usage or memory usage during the respective time period. The method includes reporting the collected resource usage information to the server system. The method includes, at the server system or at the N respective machines, storing environmental cost information corresponding to each of the N respective machines, the environmental cost information for a respective machine including one or more of power cost information, with respect to the cost of power consumed by the respective machine, and environmental impact information based on a source of the power consumed by the respective machine. The method includes determining, for each of the N respective machines for each analysis time period in a sequence of analysis time periods, power or environmental cost information based on the stored environmental cost information and the collected resource usage information for one or more of the reporting time periods. The method includes, at the server system, performing operations including, based on the determined power or environmental cost information, presenting a plurality of candidate remedial operations, wherein the plurality of candidate remedial operations include two or more user-selectable remedial operations for reducing environmental costs associated with operations performed by the distributed system. The method includes, at the server system, in response to receiving user selection of a respective remedial operation, performing or initiating performance of the remedial operation.

In another aspect of the invention, a non-transitory computer-readable medium, having instructions stored thereon, which when executed by one or more processors of a computational machine cause the computational machine to perform operations implementing any of the client-side methods described herein.

In another aspect of the invention, a computational machine in a computer network that has a plurality of nodes includes one or more processors; and memory storing one or more programs, the one or more programs including instructions, which when executed by the one or more processors cause the respective computational machine to perform operations implementing any of the client-side methods described herein.

Other embodiments and advantages may be apparent to those skilled in the art in light of the descriptions and drawings in this specification.

BRIEF DESCRIPTION OF THE DRAWINGS

FIG. 3A illustrates an example table storing load information for a machine at a respective time in accordance with some embodiments.

FIG. 3B illustrates an example table storing idle and non-idle state information of a machine, and a calculated power consumption for each state in accordance with some embodiments.

Like reference numerals refer to corresponding parts throughout the drawings.

DESCRIPTION OF EMBODIMENTS

Figure 1:
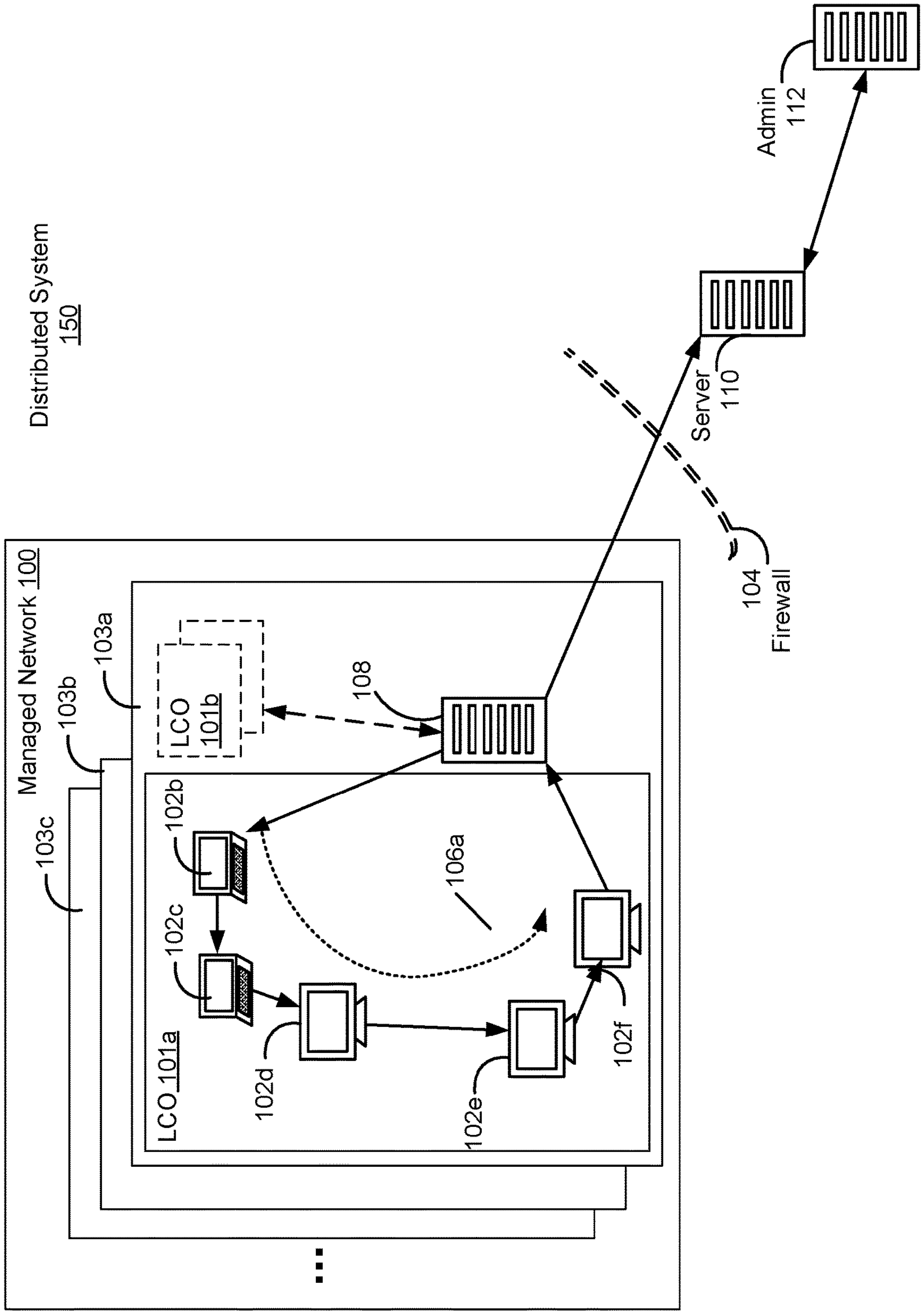
FIG. 1 illustrates a distributed system that includes a managed network comprising a plurality of interconnected machines, e.g., computers, servers, mobile devices, and other networked devices.

In an exemplary embodiment of some of the features described here, it may be desired that a distributed computer system has a way to calculate in real-time its energy costs and/or environmental footprint. Such a "footprint" may be determined based on the energy consumption of each machine on the network. In this example, the energy consumption can be determined based on the usage of each of the individual endpoints, as reflected by one or more of the CPU utilization, memory utilization, or specific processes. In some embodiments, the power consumption of an endpoint may be available from hardware sensors located on the machine. In some embodiments, the power consumption associated with the particular process running on a machine may be determined and reported. The reported energy consumption (e.g., in kWh) may then be combined with information about energy costs, either environmental (e.g., $CO_2$ generated per kWh) or financial (dollar cost per kWh) to determine the cost of operating that particular machine. Where data is collected in real-time or near real-time, cost information may be computed in real time. Using the techniques described herein, information may be collected and optionally aggregated for machines across a distributed network. For example, it may be determined in real time that a particular web browser operating on all machines across a company's network is consuming a particular amount of energy and thus resulting in a particular financial and/or environmental cost. In a further example, it may be determined that all laptops in a particular geographic area for a company are generating a particular amount of CO2 throughout a day. In a further example, it may be determined that a specific server in a data center is using an unexpectedly high amount of electricity. In a further example, it may be determined that where a company has two different models of laptop computers deployed to its employees, one model of laptop is more energy efficient. This information may be displayed to a user for environmental reporting, financial efficiencies, or decision making about what IT hardware to purchase or decommission. In further examples, this information may be used to implement control policies (sometimes referred to as remedial measures) to alter the financial and/or environmental costs, either in real-time or in projected time intervals.

In a further exemplary embodiment, requests may be received from a grid operator or energy provider to reduce power loads. For instance, an electrical grid operator may request that electricity loads be reduced during a certain time period in order to maintain sufficient electricity supply on their grid, to optimize the use of renewable energy sources, or to manage electricity pricing. In response to such a request, and having the knowledge of which machines or which computing processes are consuming electricity, the computing network may implement remedial measures to geographically shift computing loads (e.g., to a data center with a different level of energy usage restriction) or time-shift computing loads (e.g., holding off on computing tasks that can be delayed such as installing patches, or lowering the speed of computation in order to reduce power loads). In a further example, remedial measures may include deploying the use of stored electricity (e.g., electrochemical or thermal batteries). In a further example, remedial measures may include bringing online local energy sources (e.g., local power generators). Such remedial measures may be implemented manually or automatically. In some embodiments, remedial measures may be suggested to a user, and then a selection received from the user as to which one or more to implement.

In a further exemplary embodiment, a computing network operator (or administrator) may implement remedial measures in response to a desire to lower costs (environmental and/or financial) for the computer network.

In a further exemplary embodiment, a computing network may implement efficiency improvements based on the collected data about costs. For example, changes may be implemented to power policies on all laptops on a network, identification of computers left on while idle (e.g., overnight), identifying software processes that may be consuming unexpected power loads because of an error, identifying software processes that may be replaced with lower cost software (e.g., a text editor for a full-function word processor), and processes that could be offloaded from a local endpoint to a remote data center with lower energy costs.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

FIG. 1 illustrates a computer network organized into linear communication orbits, in accordance with some embodiments. More specifically, FIG. 1 illustrates a managed network 100 (sometimes herein called network 100) that includes a plurality of interconnected machines 102 (including 102*b* to 102*f*), e.g., computers, servers, mobile devices, and other networked devices that are arranged into one or more linear communication orbits (e.g., LCO 101*a* and/or LCO 101*b*). In some embodiments, the network monitoring methods described herein are performed at one or more machines (e.g., machine 102, see FIG. 1) of a linear communication orbit. In some embodiments, the methods described herein are performed at a remote server (e.g., remote server 110) that is not part of network 100 and is optionally separated from network 100 by a firewall 104, see FIG. 1. In some embodiments, the methods described herein are performed at, or at least in part at, an administrator's device 112, optionally that communicates with remote server 110. Further, managed network 100 in combination with server 110 and/or administrator's device 112 are collectively called a distributed system 150.

The linear communication orbit structure shown in FIG. 1 is an alternative to the conventional hub-and-spoke or hierarchical architecture for managed networks. However, in some embodiments, the network monitoring methods described herein are performed at one or more machines/servers of a hub-and-spoke network, where a remote server sends an instruction packet to a respective machine through the server of the hub-and-spoke network or the top machine of hierarchical architecture, and allows the respective machine to initiate an outbound connection request to the remote server. However, in such cases, the benefit and efficiency of using linear communication orbits to convey information from endpoints to a server system may be lost.

Examples of managed network 100 include enterprise networks or other networks under common management. In some embodiments, at least some of machines 102 coupled to managed network 100 are distributed across different geographical areas and/or localized at the same physical location. In some embodiments, machines 102 coupled to managed network 100 are divided into several sub-networks 103 (e.g., 103*a*-103*c*) separated by one or more firewalls

104. In some embodiments, the managed network 100 is separated from external networks by one or more firewalls 104.

In some embodiments, one or more, or two or more, or all of the sub-networks 103 include one or more linear communication orbits 101 that report to a respective server (e.g., similar to server 108 for sub-network 103*a*). In some embodiments, the sub-networks 103 are separated by one or more firewalls 104. Furthermore, in some embodiments, each of the sub-networks 103 is a local area network, or includes one or more local area networks.

In some embodiments, machines 102 currently coupled to network 100 are self-organized into one or more contiguous segments 106 (e.g., 106*a*) of a single linear communication orbit 101. In some embodiments, each contiguous segment 106 constitutes a respective linear communication orbit 101 (e.g., a continuous segment 106*a* for LCO 101*a* and another continuous segment for LCO 101*b*). Methods of self-organization of linear communication orbits are further described in U.S. application Ser. No. 15/004,757, filed Jan. 22, 2016, now U.S. Pat. No. 10,136,415, entitled "System, Security and Network Management Using Self-Organizing Communications Orbits in Distributed Networks," which is hereby incorporated by reference in its entirety.

In some embodiments, managed network 100 also includes one or more local servers 108, each of which facilitates the creation and maintenance of the one or more contiguous segments 106. The local server 108 may be relatively lightweight, and in some embodiments may be elected from machines 102 in the network (e.g., in a respective sub-network 103).

In some embodiments, as shown in FIG. 1, the linear communication orbit linking all of the machines coupled to network 100 includes a respective communication channel between each pair of adjacent machines in an ordered sequence of all machines 102 in network 100.

An important feature of linear communication orbit(s) 101 is that, in some embodiments, they are automatically formed without global, continuous, and/or active intervention by any network administrative program or personnel. Each machine 102 joining network 100 is equipped with (or provided with) a set of predetermined organization rules. According to the set of predetermined organization rules, each machine 102 finds its immediate neighbor machines and coordinates with these immediate neighbor machines to self-organize into a local segment of the linear communication orbit. The local segments of adjacent machines overlap and fuse into a contiguous segment of the linear communication orbit. In some embodiments, the linear communication orbit grows or contracts as machines join and leave network 100 (e.g., the network is non-static), through the independent local actions of the machines in network 100, without global, continuous, and/or active intervention by any network administrative programs or personnel. Although all machines 102 implement the same set of predetermined organization rules, and each machine directly interacts only with its immediate neighbor machines to facilitate the formation of the orbit, the predetermined organization rules are designed in a way that cause the machines' independent local actions to be globally consistent and to result in self-organization and automatic repair and maintenance of linear communication orbit(s) 106.

In some embodiments, all machines 102 coupled to network 100 are sorted into an ordered sequence according to a respective unique identifier associated with each machine 102. These identifiers are also referred to as the addresses of the machines in the network. For example, in some embodiments, respective IP addresses of machines 102 are used as the identifiers to sort the machines into an ordered sequence. In some embodiments, the machines are sorted according to decreasing IP address values, an upstream direction of the linear communication orbit is the direction of increasing IP address values, and a downstream direction of the linear communication orbit is the direction of decreasing IP address values. In some embodiments, the machines are sorted according to increasing IP address values, an upstream direction of the linear communication orbit is the direction of decreasing IP address values, and a downstream direction of the linear communication orbit is the direction of increasing IP address values.

In some embodiments, other types of unique identifiers or addresses may be used. For each type of unique identifier or address, the set of predetermined organization rules provides a deterministic way of sorting the unique identifiers or addresses of that type into an ordered sequence. Given the identifiers or addresses of two machines in the network, the relative order of the two machines and their distances in the linear communication orbit (also referred to as an interval between the two machines) can be determined. In some embodiments, not all possible addresses are occupied by a corresponding machine in the network.

In some embodiments, each machine 102 receiving a communication message (e.g., a message including a question part, and an answer part) from its upstream neighbor machine acts upon the message by providing an update to the message based on its local state or information, performing some aggregation of the information in the message (e.g., by adding to or modifying aggregated results already included in the message as received from its upstream neighbor), and/or forwarding the message to its downstream neighbor machine along the linear communication orbit. Essentially, each machine expends a small amount of resources to take on a small part of the duties of data aggregation without being overly burdened. More details on how the system, security, and network management messages are propagated to and collected from machines 102 in network 100 through linear communication orbit(s) 106 are provided in the Incorporated Disclosure.

An advantage of conveying message communications over the linear communication orbit is that queries, answers, and/or instructions (e.g., to install or update various files, applications, etc., e.g., to perform maintenance and threat abatement operations) can be quickly passed to and from many machines without excessive communication and computational overhead. In some embodiments, server 108 (or a remote server 110 in communication with server 108) generates individual queries. In some embodiments, the server determines the order, frequency, and/or priority by which the queries should be injected into a linear communication orbit. In some embodiments, the server sends out all of the queries and the evaluation criteria that individual machines can use locally to prioritize the evaluation of the rules in the queries. The individual machines perform local evaluation of the rules with the order and frequencies set in accordance with the evaluation criteria, and send the results back to server 108 through the linear communication orbit.

In some embodiments, while queries are passed from endpoint machine to endpoint machine along a linear communication orbit, individual queries can be directed to or targeted to a subset of the endpoint machines in a linear communication orbit, so that only a specified subset of the endpoint machines in the linear communication orbit process the query. For example, a respective query can include one or more filters specifying particular endpoint machines, and/or types of endpoint machines, and/or characteristics of endpoint machines, that are to process the query, while other endpoint machines that receive the query merely pass the query to the next endpoint machine in the linear communication orbit.

In some embodiments, server 108 sends the results (e.g., sends an aggregated response) to remote server 110. In some embodiments, remote server 110 communicates with server 108 via secure connection 114. In some embodiments, when remote server 110 needs to send a message or instruction packet to a particular machine in the network and a direct connection between remote server 110 and the particular machine does not already exist, remote server 110 optionally sends the message to server 108 and has server 108 forward the message or instruction packet to the particular machine along the linear communication orbit. In some embodiments, remote server 110 starts a network-wide information gathering processes by sending a series of queries to server 108 (or a head machine of the linear communication orbit), allowing server 108 (or the head machine) to propagate the queries into the network along the linear communication orbit, and receiving the answers or evaluation results (e.g., individual answers, aggregated answers, and/or metrics and statistics computed based on the answers or evaluation results collected from the machines in the network) from server 108 (or an end machine of the linear communication orbit).

The lightweight, decentralized mechanism (e.g., the set of common action rules observed by the machines in the network) allows the machines in the network to self-organize into one or more linear communication orbits, and allows the linear communication orbits to recover/self-heal from broken links and slow connections (e.g., by temporarily bypassing the unresponsive machines) without active administrative intervention. The self-organization and self-healing aspects of the linear communication orbits ensure that communication and data collection bottlenecks are quickly discovered and eliminated, without causing much observable impact on the communication and data collection speed. In addition, when collecting data along the linear communication orbits, the server may inject queries regarding different aspects of the machines in separate messages, and the messages may be propagated down the linear communication orbit, processed in parallel at the machines, and answered by as many machines as possible (e.g., machines that satisfy per matching criteria specified by the messages), without being held up by any slow responding machines. In fact, communication with and data collection from any and all machines in the network (e.g., enterprise networks with thousands or millions of machines) may be accomplished in substantially real-time (e.g., a matter of seconds), as opposed to taking days and weeks in a network with a conventional hierarchical or hub-and-spoke configuration. For example, messages are delivered to the machines at the speed at which messages are propagated through the linear communication orbit, and the processing of the queries at the machines occurs after receiving the messages, in parallel at the machines. In some embodiments, answers to the queries are collected in a subsequent traversal of the linear communication orbit by either the original messages (propagating in the reverse direction) or by subsequent "answer collection" messages.

Figure 2:
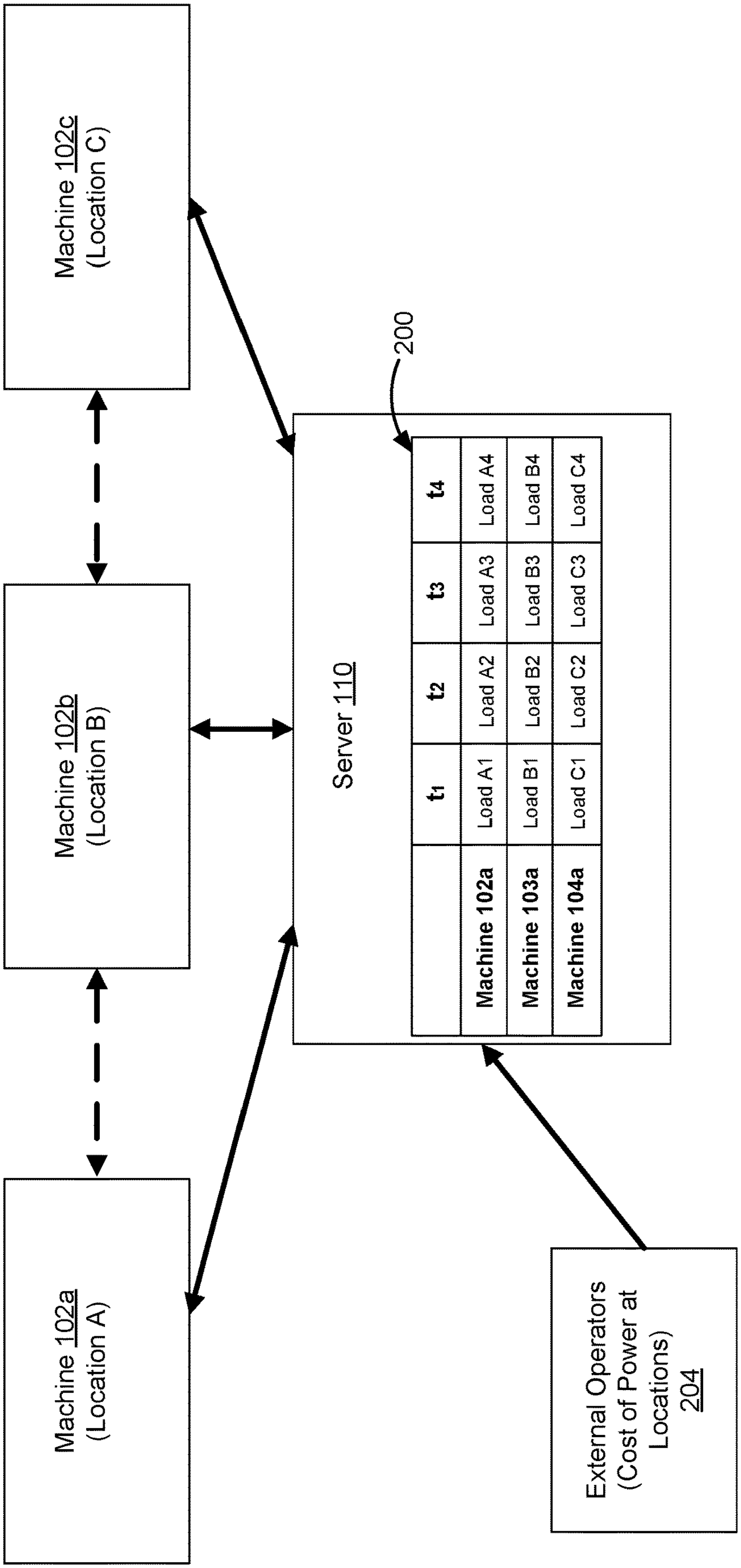
FIG. 2 illustrates an example cost determination system that retrieves and stores cost information for machines at different locations in accordance with some embodiments.

FIG. 2 illustrates a system diagram of server 110 receiving and storing load data (e.g., also referred to herein as usage information) for a plurality of machines. It is noted that in various implementations, the functions described here as being performed by server 110 may be performed at server 108, or an administrator's machine 112. In some embodiments, the functions described herein as a being performed by server 110 may be performed at one or more of machine 102*a*, machine 102*b*, and machine 102*c* (e.g., endpoint machines), and/or at one or more "super node"—that is, an endpoint that is serving as a node for several endpoints at least with respect to these functions. In some embodiments, load calculations within a reporting time period are performed at the respective endpoint(s). For example, cost information (e.g., received at server 110 from the operator) is forwarded to each endpoint, such that the respective endpoint is enabled to perform the load calculations locally. In some embodiments, the endpoint calculates its footprint (e.g., by multiplying its load information by the received cost information) and reports its footprint (e.g., calculated costs) to server 108, server 110 and/or administrator's machine 112. For example, the footprint (e.g., the calculated cost) is sent from the endpoint to the server 108 (e.g., on the LCO of the respective endpoint, as shown in FIG. 1), and/or to server 110 and/or to administrator's machine 112. In some embodiments, machine 102*a*, machine 102*b*, and machine 102*c* (e.g., endpoint machines) are on a same linear communication orbit, or are within a same network (e.g., network 100). In some embodiments, machine 102*a*, machine 102*b*, and machine 102*c* are on different linear communication orbits, and/or are hosted on different networks (e.g., machine 102*a* on sub-network 103*a*, machine 102*b* on sub-network 103*b*, and machine 102*c* on sub-network 103*c*). In some embodiments, each machine 102*a*, 102*b* and 102*c*, is physically located at a different geographic location. For example, machine 102*a* is at Location A, machine 102*b* is at Location B, and machine 102*c* is at Location C. It will be understood that additional machines may be physically collocated with machines 102*a*, 102*b* and/or 102*c*, and are optionally part of a same, or separate, linear communication orbit.

In some embodiments, server 110 also receives information from one or more external operators 204 (e.g., utilities companies, energy providers, grid operators, government data sources, or third party providers of energy cost and environmental impact information for respective utility companies or energy providers). In some embodiments, data from external operators may be obtained using an API. For instance, the Electric Reliability Council of Texas (ERCOT) may make an API available to electricity users, through which those users can retrieve data about the status of the electrical grid using API calls. In a further example, the U.S. Environmental Protection Agency (EPA) may make data available about environmental costs of certain energy sources through API calls and/or through other data download formats. In some embodiments, the received information includes an indication of an energy source (e.g., renewable vs non-renewable energy, solar, gas, coal, wind, etc.) for one or more geographic regions. For example, Location A is provided with energy produced from a wind and/or other renewable energy source (or a first combination of renewal energy sources and gas or coal based energy sources), while Location B is provided with energy produced from gas and/or coal as the energy source (or a second combination of renewal energy sources and gas or coal based energy sources, different from the first combination). In some instances, energy source usage is identified in percentages of various sources, and is updated in real time. In an example, Location A may receive information from the California Independent System Operator (CalISO) that electricity provided from 12:00 pm to 12:30 pm is generated using 21% solar, 9% wind, and 70% natural gas. In some instances, external operator 204 may provide forecasted data reflecting expected data at some point in the future. In an example, server 110 may receive information that Location A is expected to receive 100% solar-generated electricity from 11 am to 4 pm, and 50% natural gas, 50% solar from 4 pm to 8 pm. In some embodiments, the energy source information is used, along with real-time usage information, to calculate an environmental cost of the machines at a respective location.

In some embodiments, server 110 receives an indication of a cost of the energy for the one or more geographic regions (e.g., cost per kWh). As described in more detail below, in some embodiments, server 110 and/or administrator 112 determines environmental and/or energy (e.g., financial) costs (also referred to herein as power information) for respective endpoints or endpoint's processes that are running at respective locations in the one or more geographic regions. For example, the cost of energy at Location A is higher (or lower) than the cost of energy provided at Location B, and therefore processes (e.g., applications, computations, and other disk usage) are more expensive (in terms of environmental and/or financial cost) at Location A than at Location B.

In some embodiments, the server 110 stores information corresponding to each endpoint machine, including information identifying a type of each respective endpoint machine and/or one or more intended or specified usage categories (e.g., one or more of: database server, computational server, engineer's client device, or administrative user's client device, etc.) for each respective machine. For example, a machine is identified (by the server-stored information) as a server, a laptop, a virtual machine, or another type of client device. In some embodiments, information stored about endpoint machines includes specific hardware identifiers such as the model of CPU, presence of battery backup, or amount of memory. In some embodiments, the administrator's machine 112 and/or server 110 selects a remedial action based on usage information for the machine (e.g., remedial actions such as changing to a low power mode (e.g., to avoid turning off a server), moving a location of a virtual machine host, moving an application or application component to another machine in the managed network 100 that is more efficient, or lower energy cost, and/or lower environmental impact, etc.), or time-shifting a software process (e.g., delaying installation of software patches until the machine is powered by solar power). For example, based on the server-stored information, the suggested remedial action(s) are constrained so as not to interrupt essential functions; e.g., certain types of processes and computations, even if causing a high energy and/or environmental cost, should not be turned off, interrupted, or otherwise moved (e.g., offloaded) to another machine.

In some embodiments, the server collects, from each machine (also referred to herein as an endpoint or endpoint machine), including machine 102*a*, machine 102*b* and machine 102*c*, using an endpoint power sensor, information from the endpoints to be used in an energy calculation, which is then used to control the systems (e.g., by taking remedial actions). In some embodiments, the endpoint power sensor includes a software module executed by the respective endpoint machine, so as to collect power usage information and provide that information to the server.

In some embodiments, a calculation of energy usage for each endpoint is based at least in part on a calculation of: (derived wattage of the endpoint)*(the number of hours the endpoint has been running). This produces a watt-hour figure based on the details of the endpoint and how much that endpoint has been used. It will be understood that, in some embodiments, another calculation is used to determined actual energy usage for each machine. In some embodiments, the calculations use data other than approximated data that is made available from electricity metering at a plug of the machine.

In some embodiments, the endpoint power sensor enumerates the environment (e.g., including an operating system and/or applications) that it is running on the endpoint and/or stores information relating to CPU or disk utilization as it relates to energy consumption. For example, the endpoint power sensor determines (or approximates) how much energy consumption an operating system and/or an application is using by executing at the endpoint.

In some embodiments, the endpoint power sensor determines whether the endpoint is running on a cloud (e.g., in a server system located in a data center) or in a virtual environment. For example, different energy use calculations are used based on the virtual machine or cloud instance type. In some embodiments, a distinct calculation is used for a physical technology asset. For example, if the machine is a cloud or virtual environment, the instance size is used to determine the energy consumption (e.g., and the calculation comprises multiplying the energy consumption by the uptime of the endpoint). In some embodiments, if the machine is running a cloud or virtual environment (e.g., on physical machine 102*a*), the machine 102*a* retrieves data on both the (i) instance of the cloud or virtual environment and (ii) hardware details of machine 102*a* (e.g., CPU wattage (multiplied by a number of CPUs), GPU wattage (multiplied by a number of GPUs, storage/disc wattage, memory wattage, and peripheral wattage over a threshold amount of wattage (e.g., monitors, printers, etc.)).

In some embodiments, CPU and/or GPU and memory utilization levels are taken into account and used to weight the wattage calculation (e.g., as lower utilized hardware will result in lower energy consumption). This information may include usage details at, for example, the specific software processes running, processor utilization, and processor power consumption.

In some embodiments, a total wattage derived for the machine (e.g., machine 102*a*) is multiplied by the uptime of the machine over a 24 hour (or other appropriate) period to generate a "daily watts consumed" figure for the machine.

In some embodiments, server 108 uses the information retrieved from the endpoint power sensor to calculate and/or store load information for each machine (e.g., machine 102*a*, machine 102*b*, and machine 102*c*) at various points in time (e.g., $t_1$ through $t_4$), as illustrated in table 200 in FIG. 2. In some embodiments, the load information collected for a respective machine at a respective time includes additional detail, as illustrated in FIG. 3A. In some embodiments, the server system receives resource usage reports from monitored machines (e.g., all monitored machines, potentially excluding any malfunctioning machines and/or machines operating in a low power mode) for any given time period, e.g., a period ending at $t_4$, within a predefined amount of time, such as within N seconds (e.g., 1 to 100 seconds) of the end of the given time period, so that the server system receives and is able to respond to resource usage by the monitored machines in real-time.

While FIG. 2 shows resource usage information collected for four time periods, it is to be understood that the server system 110 is configured to continue receiving resource usage information for a continuing sequence of time periods, in real-time, and thus will over time will receive and store resource usage information for hundreds or thousands of time periods. In some embodiments, server system 110 may consolidate historical resource usage information, e.g., for time periods more the predefined amount of time (e.g., more than D days, where D is a value between 1 and 100), earlier than a present time into one or more combined sets of resource usage information for a sequence of aggregated time periods, each encompassing multiple reporting periods.

In some embodiments, the points in time (e.g., $t_1$ through $t_4$) correspond to reporting periods at which times machines report the collected resource usage information to the server system. For example, the reporting periods are set such that usage information is sent, in real-time, e.g., no less often than once per S second period (e.g., where S is any predefined value between 1 and 300 seconds, inclusive), once per minute, or once per 5 minute period, or once per hour).

FIG. 3A illustrates an example of load information for a respective machine at a respective time (e.g., Load C4 for machine 102*c* at $t_4$). In some embodiments, as illustrated in FIG. 3, server 110 (or, optionally administrator 112, server 108 and/or a machine 102*a*, 102*b*, or 102*c*) calculates and/or stores load information (e.g., energy consumption) for an operating system and/or applications executing on the respective machine 102*c*. In some embodiments, the load information includes a load of one or more components of machine 102*c*. For example, the one or more components include one or more of a processor (e.g., CPU or GPU), a monitor, a printer, a storage device, etc., as described in more detail below with reference to FIG. 3B. In some embodiments, server 108 includes aggregated usage data, aggregated by the total energy consumption of the machine and/or aggregated by the total energy consumption of the region (e.g., of all of the machines collocated with the respective machine 102*c*). For example, machine 102*c* at time $t_4$ collects (e.g., via the endpoint power sensor of machine 102*c*) usage data for applications that are executing on machine 102*c*, including an operating system, and applications 1-3. In some embodiments, server 110 and/or administrator 112 calculates, from the usage data and data received from external operators 204, an energy cost 300, and one or more environmental costs 302 and 304 for each application, and for the machine as a whole (e.g., aggregate (machine)). In some embodiments, the energy cost 300 is a representation of the cost of the electricity (e.g., as reported by external operators 204) for Location C (where machine 102*c* is located) multiplied by the amount of energy used by the various applications executing on machine 102*c*. In some embodiments, the environmental costs are broken down by particular types of emissions (e.g., based on energy source data for Location C), for example environmental cost 302 corresponds to $CO_2$ emissions and environmental cost 304 corresponds to $SO_2$ emissions, $CH_4$ emissions, nuclear waste material generated, a statistical downstream risk of harm from generation, or other generation cost. In some embodiments, the environmental emissions costs are aggregated (e.g., using a weighted average, or a summation), into a single overall environmental cost, or into a plurality of categories of environmental costs.

In some embodiments, energy usage per respective machine is determined by monitoring idle and non-idle times for each known or monitored component (e.g., each processor (e.g., CPU or GPU), monitor, storage device, etc.) of the respective machine. In some embodiments, for at least some components, more states than idle and non-idle are monitored. For example, a CPU may have an idle state and two or more non-idle states (e.g., state A, state B and state C, illustrated in FIG. 3B) that can be detected by a hardware or software monitor module. For each monitored component, for a respective time period (e.g., an hour, day, week), the amount of time (e.g., in hours, days, weeks, or another measurement of time) spent by the component in each state (e.g., as illustrated in table 310 of FIG. 3B) is multiplied by a power consumption rate for that state (e.g., as illustrated in table 312), and those values are summed to determine an estimated power usage for the monitored component for the respective time period. For example, the estimated power usage, $P_X$, for a component X is calculated by:

$$P_X = R_{idle}t_{idle} + R_A t_A + R_B t_B + R_C t_C + \ldots$$

where $R_i$ is the power consumption rate for a state i (e.g., including an idle state, state A, state B, and state C) and $t_i$ is the amount of time the component has been in the state i within the respective time period. The estimated power usage for all the monitored components are summed to determine an estimated power usage ($P_{total}$) for the respective machine for the respective time period. For example, $P_X$ is calculated for component 1, component 2, component 3 and component 4 (e.g., and any other components, for a total of Y monitored components, monitored for the machine), and the estimated power usage for all of the monitored components of machine 102*a* (or any of the other machines 102 shown in FIGS. 1 and 2), $P_{total}$, is calculated by:

$$P_{total} = \sum_{X=1}^{Y} P_X.$$

In some embodiments, the power consumption rate for a particular monitored component is determined by identifying the particular monitored component, for example using information received from the particular monitored component using the UPnP (universal plug and play) protocol, or by determining information concerning one or more characteristics of the particular monitored component (e.g., screen size and screen type for a monitor; storage type (e.g., hard disk, flash memory), storage capacity, number of platters, etc. for a storage device; number of processor cores for a processor), and then either obtaining a power consumption rate for each state of the identified component from a lookup table (e.g., as illustrated by table 312 in FIG. 3B), or by using information obtained from a lookup table to convert that information into a power consumption rate for each state of the identified component. For example, the lookup table includes information about the component, such as a monitor size (e.g., for a monitor component) or storage type (e.g., for a memory component), where the power consumption rate is estimated using the information provided about the component. Using this methodology, a power consumption rate can be determined for each monitored component for each state of the monitored component. The estimated power usage for all the monitored components are summed to determine an estimated power usage for the respective machine for the respective time period. Furthermore, optionally, the estimated power usage for a respective machine, based on the estimated power usage by the monitored components of the respective machine, can be increased by applying a multiplicative factor, e.g., a value between 1.05 and 1.5, so as to take into account power usage by unmonitored components, and/or to take into account brief spikes in power usage that may be missed by the monitoring methodology being used. In some embodiments, the multiplicative factor is based on power usage measurements of actual machines divided by the summed estimated power usage of all the monitored components of those same machines.

As a prophetic example, the energy usage (e.g., load information) for machine 102*a* (FIG. 2) is calculated using the information provided in table 310 and table 312 illustrated in FIG. 3B, for example, over a time period that spans $t_1$ to $t_4$ (e.g., or another time period). Table 310 illustrates that, over the time period, the table stores an amount of time (e.g., an aggregated amount of time) that each of the components of machine 102*a* were in a respective state (e.g., an idle state, a non-idle state A, a non-idle state B, and/or a non-idle state C). In some embodiments, different components have different non-idle states. For example, component 1 has possible non-idle states A, B and C, while component 2 has possible non-idle states B and C, component 3 has possible non-idle states A and C, and component 4 has possible non-idle state A. As such, the different states for different components, for example, a printer, versus a storage device, are monitored and stored in table 310.

In some embodiments, as explained above, the power consumption rate for each state of each component is either stored in a lookup table (e.g., table 312) or is calculated using other information stored in another lookup table (e.g., derived from a database that includes information about the component). As such, for the time period, the respective amount of time a particular component was in a respective state is multiplied by the power consumption rate for the respective state to determine the power consumption attributed that the component in that state over the time period. The power consumption is calculated for each state (e.g., where each state has a different power consumption rate), and is aggregated (e.g., by adding the calculated power consumption of each state of the component over the time period) to determine the overall power consumption of the component for the time period.

It will be understood that although FIG. 3B illustrates machine 102*a* has four monitored components, each component having between one and three non-idle states, other machines may have a different number of monitored components, each component having different non-idle states.

In some embodiments, the server 108 and/or administrator 112 performs the calculations for a given analysis time period (e.g., which may or may not be the same as the reporting time periods, but in general not shorter than the reporting time periods, e.g., each of which encompasses a set of P of the reporting time periods).

Figure 4A:
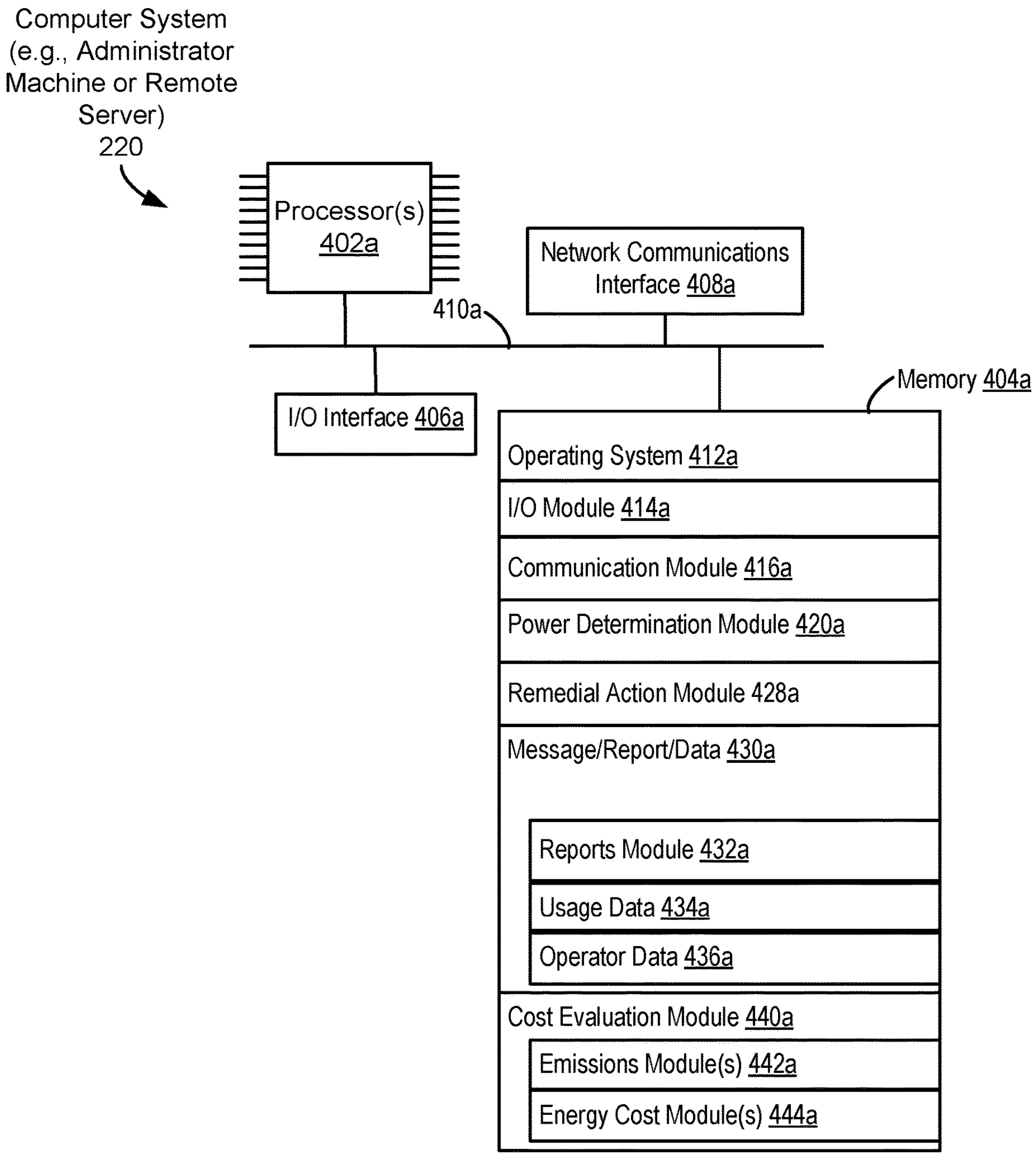
FIG. 4A is a block diagram of an example computer system, such as administrator machine in a distributed system as shown in FIG. 1 in accordance with some embodiments.

FIG. 4A is a block diagram of an example of an administrator machine or remove server 220 (e.g., administrator machine 112 or remote server 110) that is coupled to a manage network 100, e.g., one or more of the linear communication orbits shown in FIG. 1, in accordance with some embodiments. For ease of explanation, computer system 220 will be described as an administrator machine, and called administrator machine 220, but it is to be understood that in some embodiments computer system 220 is a remote server 110 (see FIG. 1) that performs the administrative functions described herein with respect to administrator machine 220.

In some embodiments, administrator machine 220 includes one or more processors 402*a*, memory 404*a* for storing programs and instructions for execution by one or more processors 402*a*, one or more communications interfaces (such as input/output interface 406*a* and network interface 408*a*), and one or more communications buses 410*a* for interconnecting these components.

In some embodiments, input/output interface 406*a* includes a display and input devices such as a keyboard, a mouse or a track-pad. In some embodiments, communication buses 410*a* include circuitry (sometimes called a chipset) that interconnects and controls communications between system components. In some embodiments, memory 404*a* includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. In some embodiments, memory 404*a* includes one or more storage devices remotely located from the one or more processors 402*a*. In some embodiments, memory 404*a*, or alternatively the non-volatile memory device(s) within memory 404*a*, includes a non-transitory computer readable storage medium.

Figure 5:
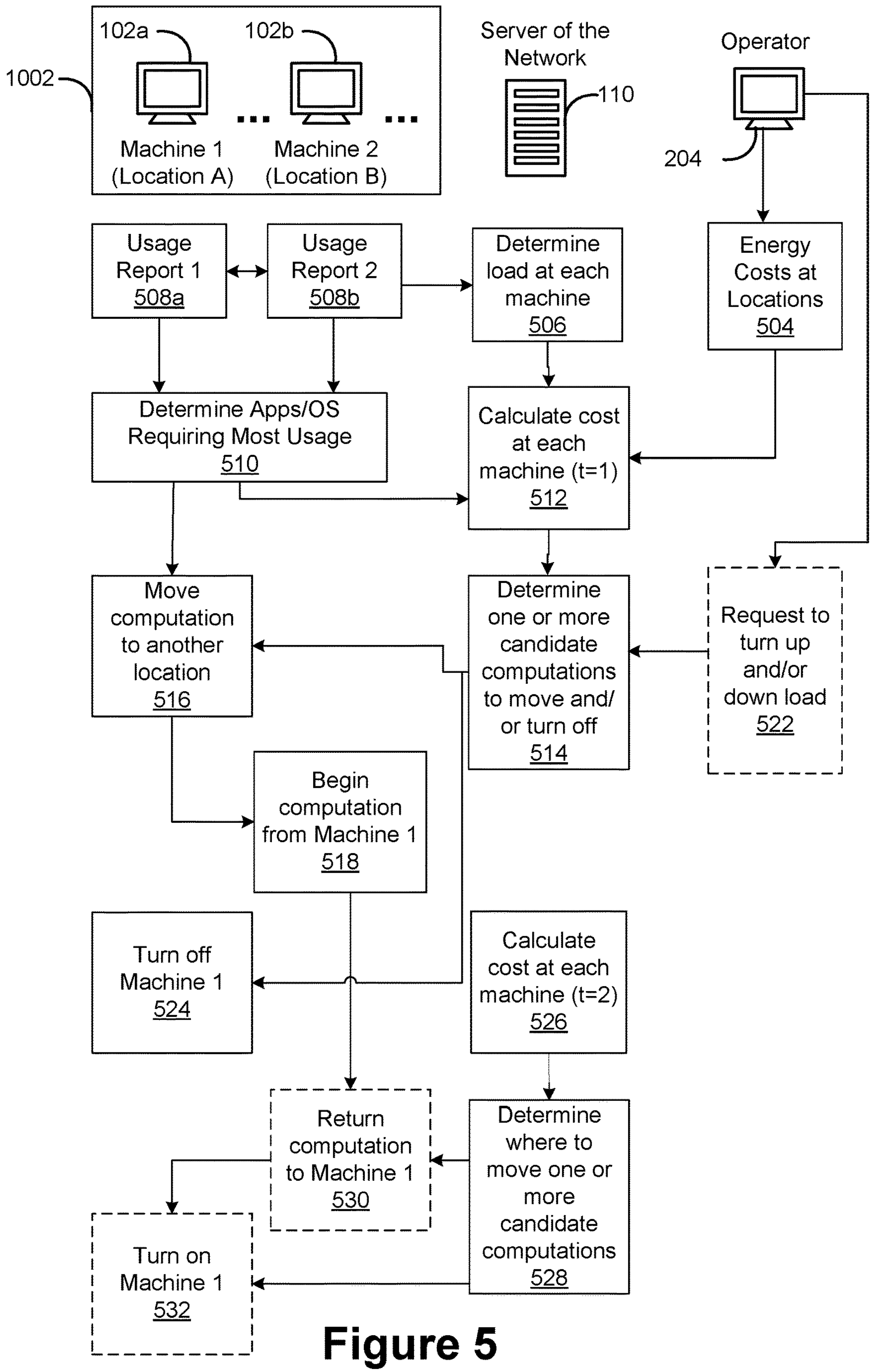
FIG. 5 is a flow diagram illustrating a process for moving and/or turning off computations at respective machines in accordance with a determined load, in accordance with some embodiments.

In some embodiments, memory 404*a* or alternatively the non-transitory computer readable storage medium of memory 404*a* stores the following programs, modules and data structures, instructions, or a subset thereof:

- Operating System 412*a* that includes procedures for handling various basic system services and for performing hardware dependent tasks;
- I/O module 414*a* that includes procedures for handling various basic input and output functions through one or more input and output devices;
- Communication module 416*a* that is used for connecting administrator machine 220 to a server system (e.g., server 202) and/or other machines via one or more network communication interfaces 408*a* (wired or wireless) and one or more communication networks, such as the Internet, other wide area networks, local area networks, metropolitan area networks, and so on;
- Power determination module 420*a* that includes instructions for determining an amount of power consumed by the machines in the managed network 100, and optionally a cost of the power consumed. In some embodiments, the power determination module 420*a* determines machines in managed network 100 and/or locations at which multiple machines in managed network 100 for which the consumption of power and/or environmental cost or impact meets or fails to meet predefined criteria (e.g., by consuming more power or causing a greater environmental cost or impact than a predefined threshold or determined target), or determines applications or workloads performed by machines and/or locations in managed network 100 that if transferred to other machines or locations in managed network 100 would lower the consumption of power and/or environmental cost or impact of the managed network 100. In some embodiments, the power determination module determines machines and/or locations consuming more than a threshold amount of power, indicating a remedial action should be taken for the identified machines and/or locations.
- Remedial action module 428*a* for identifying, and providing to a user of administrator machine 220, one or more recommended remedial actions in accordance with current power usage and/or environmental cost or impact of respective machines in managed network 100, where the recommended remedial actions are selected from a set of remedial actions, sometimes called candidate remedial actions;
- Messages, reports and/or other data 430*a* that is stored, temporarily or otherwise, upon receipt from server 202, and/or that is locally generated, revised or supplemented by administrator machine 220 prior to transmission to server 202. In some embodiments, messages, reports and/or other data 430*a* further include one or more of:

reports module 432*a* for generating and storing one or more reports that optionally include average power usage and/or trends in power usage, and/or trends in power usage; in some embodiments, reports module 432*a* obtains cost information from cost evaluation module 440*a* and generates and stores one or more reports that include environment cost or impact during various time periods, a combined score that reflects an average environment cost or impact, and/or trends in environment cost or impact; in some embodiments, reports module 432*a* generates and stores reports that are described in more detail with reference to FIG. 5 (e.g., reports 508*a* and/or 508*b*);

usage data 434*a*, indicating an amount of usage, and optionally and indication of use of specific applications or computations, collected from the computational machines located at a first subset of nodes of one or more linear communication orbits 204, operator data 436*a* received from (e.g., collected from) an external operator that indicates a cost and/or source of power consumed at respective locations in managed network 100; and Cost evaluation module 440*a*, which evaluates the costs (including environmental costs, such as emissions costs and/or energy costs), determined from the usage data 434*a* (e.g., collected from) the computational machines in managed network 100 and from operator data 436*a*, for example received from an operator that provides energy. In some embodiments, in accordance with the cost evaluation module, the administrator machine initiates one or more remedial actions (sometimes called remediation tasks) at respective computational machines, so as to increase/decrease and/or offset (e.g., shift) respective loads at respective computational machines. In some embodiments, cost evaluation module 440*a* includes emissions module(s) 442*a* for calculating, with respect to individual machines or set of machines and/or all machines in managed network 100, environmental costs and energy cost module(s) 444*a* for calculating the cost of power consumed by individual machines or a set of machines and/or all machines in managed network 100.

In some embodiments, power determination module 420*a* and cost evaluation module 440*b* are implemented as a single module, while in other embodiments these are separate modules.

Optionally, administrator machine 220 is a machine coupled to server 202, but does not belong to a linear communication orbit 204 on which the local environment verification framework is deployed. Optionally, administrator machine 220 is integrated within server 202. More details on server 202 are provided below with respect to FIG. 4B.

Optionally, administrator machine 220 is a computational machine coupled to or included in a linear communication orbit 204 and configured to function as an administrator to control deployment of the local environment verification framework and collect local environment verification results and risk scores from computational machines located at nodes on a respective linear communication orbit 204. In these circumstances, administrator machine 220 includes one or more of modules shown in FIG. 4C for performing the functions of a computational machine, e.g., in a subnetwork 103 or a linear communication orbit 101 (FIG. 1). More details on embodiments of administrator machine 220 coupled on (or included in) a linear communication orbit 204 are provided below with reference to FIG. 4C.

Figure 4B:
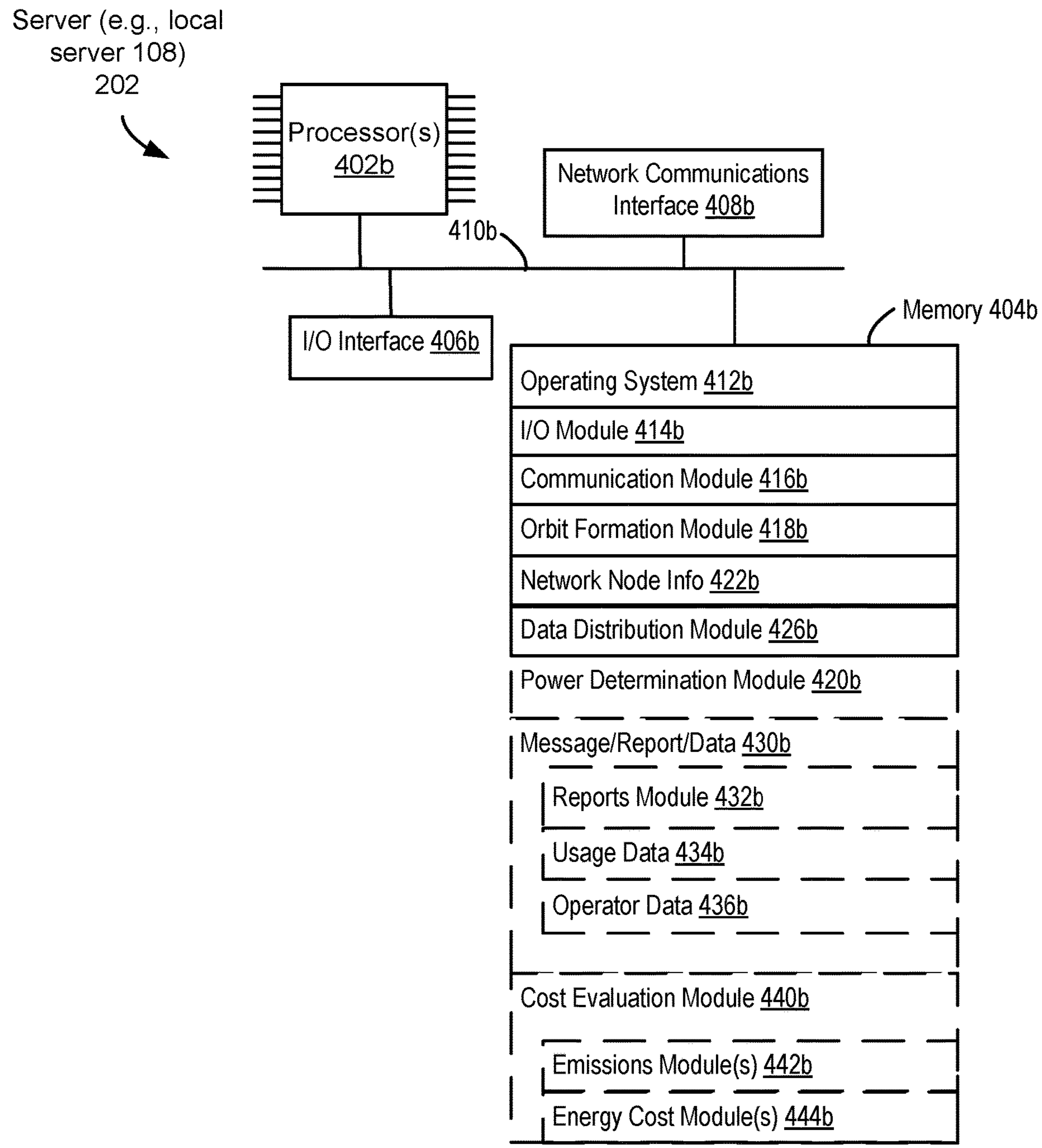
FIG. 4B is a block diagram of an example local server for a respective sub-network, such as one of the example linear communication orbits shown in FIG. 1 in accordance with some embodiments.

FIG. 4B is a block diagram of a server system 202, herein called server 202 for ease of reference, an example of which is server 108, which is coupled to one or more linear communication orbits, as shown in FIG. 1, in accordance with some embodiments. In some embodiments, server 202 includes one or more processors 402*b*, memory 404*b* for storing programs and instructions for execution by the one or more processors 402*b*, one or more communications interfaces such as input/output interface 406*b* and network interface 408*b*, and one or more communications buses 410*b* for interconnecting these components.

In some embodiments, server 202 does not include an input/output interface 406*b*. In some embodiments in which server 202 does include an input/output interface 406*b*, input/output interface 406*b* includes a display and input devices such as a keyboard, a mouse or a track-pad. In some embodiments, communication buses 410*b* include circuitry (sometimes called a chipset) that interconnects and controls communications between system components. In some embodiments, memory 404*b* includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. In some embodiments, memory 404*b* includes one or more storage devices remotely located from the one or more processors 402*b*. In some embodiments, memory 404*b*, or alternatively the non-volatile memory device(s) within memory 404*b*, includes a non-transitory computer readable storage medium.

In some embodiments, memory 404*b* or alternatively the non-transitory computer readable storage medium of memory 404*b* stores the following programs, modules and data structures, instructions, or a subset thereof:

Operating System 412*b* that includes procedures for handling various basic system services and for performing hardware dependent tasks.

I/O module 414*b* that includes procedures for handling various basic input and output functions through one or more input and output devices.

Communication module 416*b* that is used for connecting server 202 to one or more computational machines (e.g., machines 206-218 on linear communication orbit 204, as shown in FIG. 2) coupled to network 100 (FIG. 1) via one or more network communication interfaces 408*b* (wired or wireless) and one or more communication networks, such as the Internet, other wide area networks, local area networks, metropolitan area networks, and so on.

Orbit formation module 418*b* that includes instructions to implement a predetermined set of rules for creating, maintaining, and repairing one or more linear communication orbits for network and system management (e.g., to determine which machines 102, of all machines 102 currently known to be coupled to network 100, are coupled to the same local area network, and to communicate information to those machines to enable them to self-organize into a linear communication orbit), where in some embodiments, orbit formation module 418*b* also stores a list of singletons, and head nodes and/or tail nodes of the linear communication orbits in the network;

Network node information 422*b* that includes information identifying all nodes known to be coupled to managed network 100 or coupled to a particular sub-network 103 of managed network 100, where in some embodiments, server 202 maintains a record of nodes currently known to be coupled to the managed network 100 or sub-network 103 and their respective unique identifiers (e.g., IP addresses and optionally other unique identifiers), and optionally, server 202 also maintains the ordinal positions of these machines in a sorted sequence according to their respective unique identifiers;

Data distribution module 426*b* for distributing messages (e.g., system management messages) and files (e.g., programs, such as program for power usage monitoring, and updates to programs) to machines 102 in a respective sub-network 103, and optionally for collecting data produced by the machines 102 in the respective sub-network 103 that is to be forwarded to server system 220, or optionally preprocessed by server 202 and then forwarded to server system 220.

Optionally, in embodiments in which sub-networks 103 are configured as linear communication orbits 101, server 202 includes orbit formation module 418*b*. Orbit formation module 418*b* includes instructions to implement a predetermined set of rules for creating, maintaining, and repairing one or more linear communication orbits for network and system management (e.g., to determine which machines 102, of all machines 102 currently known to be coupled to managed network 100, are coupled to the same local area network or a respective sub-network 103, and to communicate information to those machines to enable them to self-organize into a linear communication orbit 101), where in some embodiments, orbit formation module 418*b* also stores a list of singletons (if any), and head nodes and/or tail nodes of the linear communication orbits in the sub-network 103 serviced by server 202.

In some embodiments, server 202 performs computations for determining power usage by machines in the sub-network 103 that are serviced by server 202, and optionally cost evaluation based on the determined power usage. Having server 202 perform such tasks for the machines 102 in the sub-network 103 serviced by server 202 helps to distribute, over multiple instances of server 202 (e.g., one such server 202 for each sub-network 103), the computational load associated with real time monitoring of power usage and environmental costs or impact by the machines 102 in a distributed system 100, thereby reducing the computational load on server system 220. In such embodiments, server 202 includes:

Power determination module 420*b* that includes instructions for determining an amount of power consumed by the machines, and optionally a cost of the power consumed. In some embodiments, the power determination module determines machines and/or locations consuming more than a threshold amount of power, indicating a remedial action should be taken for the identified machines and/or locations;

Messages, reports and/or other data 430*b* that is stored, temporarily or otherwise, upon receipt from computational machines 102 in a sub-network 103 or from administrative machine 220, and/or that is locally generated, revised or supplemented by server 202 prior to transmission to computational machines 102 or administrative machine 220, where in some embodiments, messages, reports and/or other data 430*b* further include one or more of:

reports module 432*b* for generating and storing one or more reports that optionally include average power usage and/or trends in power usage by machines in the sub-network 103 serviced by server 202;

usage data 434*b*, collected from the computational machines in the sub-network 103 serviced by server 202 (e.g., located at a first subset of nodes of one or more linear communication orbits 204);

operator data 436*b* received from (e.g., collected from) an external operator that indicates a cost and/or source of power consumed at respective locations; and Optionally, cost evaluation module 440*b*, which evaluates the costs (including environmental costs, such as emissions costs and/or energy costs), determined from the usage data 434*b* (e.g., collected from) the computational machines in the sub-network 103 serviced by server 202 and from operator data 436*b*, for example received from an operator that provides energy. In some embodiments, in accordance with the cost evaluation module, is similar to cost evaluation module 440*a* for server system 220, but performs cost evaluations just for machines in the sub-network 103 serviced by server 202. In some embodiments, power costs and/or environmental costs determined by cost evaluation module 440*b* are communicated to server system 220, which then uses those determined costs for producing power usage and/or environmental impact reports and/or for identifying candidate remedial actions to recommend to an administrator of the distributed system.

In some embodiments, in which server 202 is not part of any linear communication orbit, server 202 need not include an orbit formation module 418*b*.

Figure 4C:
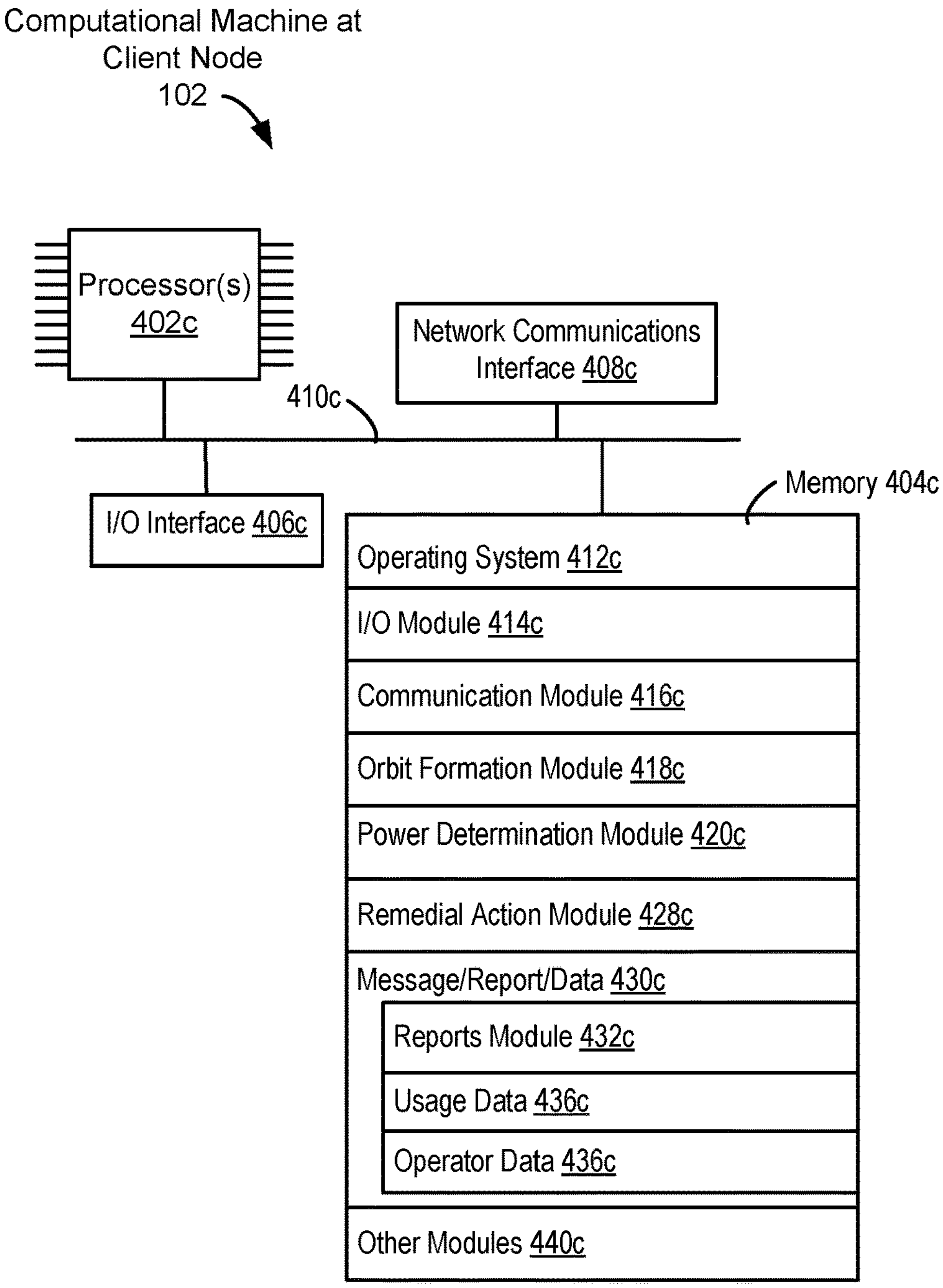
FIG. 4C is a block diagram of an example computational machine, such as a computation machine or endpoint in the example managed network shown in FIG. 1 in accordance with some embodiments.

FIG. 4C is a block diagram of a respective computational machine 102 (e.g., any of computational machines 102, FIG. 1, sometimes herein called endpoint machines or computational machines) located at a node (sometimes called a client node or endpoint or endpoint node) in any of the sub-networks 103 or linear communication orbits 101 shown in FIG. 1, in accordance with some embodiments. In some embodiments, computational machine 102 includes one or more processors 402*c*, memory 404*c* for storing programs and instructions for execution by one or more processors 402*c*, one or more communications interfaces such as input/output interface 406*c* and network interface 408*c*, and one or more communications buses 410*c* for interconnecting these components.

In some embodiments, input/output interface 406*c* includes a display and input devices such as a keyboard, a mouse or a track-pad. In some embodiments, communication buses 410*c* include circuitry (sometimes called a chipset) that interconnects and controls communications between system components. In some embodiments, memory 404*c* includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. In some embodiments, memory 404*c* includes one or more storage devices remotely located from the one or more processors 402*c*. In some embodiments, memory 404*c*, or alternatively the non-volatile memory device(s) within memory 404*c*, includes a non-transitory computer readable storage medium.

In some embodiments, memory 404*c* or alternatively the non-transitory computer readable storage medium of memory 404*c* stores the following programs, modules and data structures, instructions, or a subset thereof:

- Operating System 412*c* that includes procedures for handling various basic system services and for performing hardware dependent tasks;
- I/O module 414*c* that includes procedures for handling various basic input and output functions through one or more input and output devices;
- Communication module 416*c* that is used for connecting machine 102 to other machines (e.g., other machines 102 in managed network 100, FIG. 1) or servers (e.g., server 202) via one or more network communication interfaces 408*c* (wired or wireless) and one or more communication networks, such as the Internet, other wide area networks, local area networks, metropolitan area networks, and so on;
- Optionally, in embodiments in which machines 102 are organized into linear communication orbits, orbit formation module 418*c* that includes instructions implementing a predetermined set of rules for creating, maintaining, and repairing the linear communication orbit for network and system management;
- Power determination module 420*c* that includes instructions for determining an amount of power consumed by the machines, and optionally a cost of the power consumed. In some embodiments, the power determination module determines whether the consumption of power and/or environmental cost or impact of such power usage by machine 102 meets or fails to meet predefined criteria (e.g., by consuming more power or causing a greater environmental cost or impact than a predefined threshold or determined target), or identifies applications or workloads performed by machine 102 that, if transferred to one or more other machines in managed network 100 would lower the consumption of power and/or environmental cost or impact of the managed network 100.
- Remedial action module 428*c* for receiving, from server 202 or administrator machine 220, instructions for performing one or more (e.g., a set of) remedial actions, and for performing the remedial actions specified by the received instructions from the server and/or administrator machines;
- Messages, reports and/or other data 430*c* that is stored, temporarily or otherwise, upon receipt from another computational machine 102 or server 202, and/or that is locally generated, revised or supplemented by machine 102 prior to transmission to another computational machine 102 or server 202, where in some embodiments, messages, reports and/or other data 430*c* further include one or more of:
  - reports module 432*c* for generating and storing one or more reports that optionally include average power usage and/or trends in power usage;
  - usage data 434*c*, collected from machine 102 or from the computational machines located at a first subset of nodes a respective sub-network 103 or one or more linear communication orbits 204;
  - operator data 436*c* received from (e.g., collected from) an external operator that indicates a cost and/or source of power consumed at respective locations; in some embodiments; operator data 436*c* is optionally received from server 202 or administrator machine 220, which in turn received the operator data 436*c* directly or indirectly from an external operator; and
- optionally, other modules 440*c* and/or sets of data, locally stored at the computational machine 102.

FIGS. 4A-4C are merely illustrative of the structures of machine 220, server 202 and machine 102. A person skilled in the art would recognize that particular embodiments of machine 220, server 202 and machine 102 may include more or fewer components than those shown. One or more modules may be divided into sub-modules, and/or one or more functions may be provided by different modules than those shown. In some embodiments, server 202 implements or performs one or more methods, including the methods described below with respect to FIG. 5.

FIG. 5 is a flowchart illustrating a method of determining real-time costs of computations, and taking one or more remedial actions based on the determination of the real-time costs. As described below, in some embodiments, a server 108 performs the determination of respective loads for respective machines. It will be understood that in some embodiments, the determination of loads and/or the determination of costs for respective computations is performed at respective machines, instead of at a centralized server 108.

In some embodiments, server 108 is communicatively coupled with a plurality of machines 1002 (e.g., in a managed network 100), including machine 1 (102*a*) and machine 2 (102*b*). In some embodiments, the machines 1002 are communicatively coupled via one or more linear communication orbits. In some embodiments, machine 1 (102*a*) and machine 2 (102*b*) are on distinct linear communication orbits, optionally that report to distinct servers (e.g., machine 102*a* reports to server 108 and machine 102*b* reports to another server). In some embodiments, machine 1 (102*a*) and machine 2 (102*b*) are not geographically collocated. In some embodiments, a geographic location of a respective machine is used to determine an energy cost, as the cost of providing energy changes based on a geographic region and/or based on usage in the region at a respective time.

In some embodiments, one or more machines, or each machine, in the plurality of machines 1002 measures disk utilization at the machine. For example, machine 1 (102*a*) measures disk utilization for machine 1, for example, to determine how much computational power one or more applications and/or an operating systems that are executing at machine 1, require. In some embodiments, each machine generates a usage report that includes information about the computational usage of applications and/or operating systems. For example, machine 1 generates usage report 1 (508*a*) and machine 2 generates usage report 2 (608*b*). In some embodiments, the machines send the usage reports 508*a* and 508*b* to server 108. In some embodiments, the machines send the usage reports 508*a* and 508*b* via the respective linear communication orbit that the respective machine is part of. In some embodiments, if the machines 102*a* and 102*b* are on a same linear communication orbit, the usage reports are optionally passed between the machines on the linear communication orbit and reported to server 108.

In some embodiments, reports 508*a* and/or 508*b* include one or more of the following information: (i) an endpoint average consumption that is averaged per day, per computer group (e.g., collocated endpoints or one or more endpoints otherwise grouped together), optionally including an indication of a variation between a current respective day and respective computer group as compared to a prior week (e.g., last week) on the same day for the same respective computer group; (ii) an endpoint average consumption that is averaged per day, per computer group, optionally including an indication of a variation for the computer group over various time periods (e.g., the report displays a 1-year timeline, a 6-month timeline, a 1 month timeline, and/or other amount of time); (iii) an endpoint consumption carbon footprint, calculated per day, per computer group, and optionally including an indication of a variation between a current respective day and the respective computer group as compared to a same day in a prior week (e.g., last week) for the respective computer group; (iv) an endpoint consumption carbon footprint, calculated per day, per computer group, optionally including an indication of a variation of the endpoint consumption carbon footprint over various time periods (e.g., the report displays a 1-year timeline, a 6-month timeline, a 1-month timeline, and/or other amount of time); (v) an endpoint average consumption cost, calculated per day, per computer group, optionally including an indication of a variation of the average consumption cost for a respective computer group as compared to a prior week on the same day; (vi) an endpoint average consumption cost, calculated per day, per computer group, optionally including an indication of variation of the average consumptions cost over various time periods (e.g., the report displays a 1-year timeline or a timeline for another amount of time); (vii) a distribution of configured power plans, determined per computer group; (viii) a distribution of endpoints that have hybrid hard drives (HDDs) vs endpoints that have solid state drives (SSDs), determined per computer group; (ix) a number of endpoints with high uptime (e.g., above 30 days or another amount of time), determined per computer group and optionally including an indication of a variation of the uptime for the respective computer group compared to a prior month (e.g., last month) value; (x) a number of endpoints with high uptime (e.g., above 30 days or another amount of time), determined per computer group, and an indication of a variation of the uptime for the respective uptime over time (e.g., the report displays a 1-year timeline); (xi) a number of endpoints up (e.g., turned on and running) outside of business hours, determined per computer group and including an indication of a variation of the number of endpoints up outside of business hours as compared to a prior month's value (e.g., the number of endpoints up outside of business hours last month); (xii) a number of endpoints up outside of business hours, determined per computer group, including an indication of a variation of the number of endpoints up outside of business hours over time (e.g., the report displays a 1-year timeline or a timeline for another amount of time); (xiii) an age of endpoints, determined per computer group (e.g., the age determined using a release date of CPUs by buckets of age, OS Installation date by buckets of age, and/or purchase date by buckets of age); (xiv) a number of endpoints with high power components (e.g., graphic cards that require more than a threshold amount of power), including an indication of variation of the number of endpoints with high power components as compared to a prior month's value (e.g., last month's value); (xv) a number of endpoints with high power components, including an indication of the variation of the number of endpoints with high power components over time (e.g., the report displays a 1-year timeline or a timelines for another amount of time); (xvi) an energy score, determined per population of computer groups, including an indication of variation of the energy score for a respective population of computer groups as compared to a prior month's value; (xvii) an energy score, determined per population of computer groups with an indication of variation of the energy score over time (e.g., the report displays a 1-year timeline or a timeline for another amount of time).

In some embodiments, graphs, timelines, and/or other visual representations of the data included in the reports 508*a* and 508*b* are provided (e.g., in a user interface, such as a dashboard) to enable the user (e.g., administrator 112) to easily view and/or organize the data. In some embodiments, the user is enabled to select which data, from the sets of data (i) through (xvii) described above, to be displayed in the user interface in real-time.

In some embodiments, server 110 (or server 108 or administrator's machine 112) stores the usage reports received from the machines 102*a* and 102*b*. In some embodiments, server 108 determines a load 506 (e.g., a usage amount) at each machine, and optionally stores other data about each machine. For example, server 110 stores information about the type of machine (e.g., a server, a laptop, or a remote desktop), or how the machine is being used. Server 110 may also store in information as to whether the machine is a virtual or physical device. Server 110 may also store information about the machine's geographic location, internal and peripheral hardware, and installed software.

In some embodiments, the machines determine which applications and/or operating systems requires the most usage 510, and reports the identified applications and/or operating systems to server 108 (e.g., or equivalent server of the LCO of the respective machine), which forwards the usage 510 to server 110 and/or administrator 112.

In some embodiments, server 110 (or optionally, server 108 and/or the machines 102*a* and 103*a*) calculates 512 a cost at each machine at a first time (t=1). For example, as described with reference to FIG. 3, for a particular load at a machine, the server 110 determines an energy cost (e.g., in dollars) and/or an environmental cost (e.g., level of emissions) for an operating system and/or one or more applications executing at the machine, and/or for an entire machine (e.g., based on the energy costs 504 received from operator 204). In some embodiments, the server 110 (or server 108) aggregates the energy and/or environmental cost of the machine, or of a set of machines (e.g., that are collocated).

In some embodiments, server 110 (e.g., or an administrator 112) determines 514 one or more candidate computations (e.g., applications, operating systems, and/or entire machines) for which remedial actions should be taken. For example, based on the environmental and/or energy costs off a first computation (e.g., a first application executing on machine 102*a*) exceeding a threshold environmental and/or energy cost, the server 110 instructs the machine 102*a* to move the first computation to another machine. For example, if a computation may be executed at a different location, on a different machine (e.g., machine 103*a* at Location B) for a lower cost, the machine 102*a* stops execution of the computation and the computation is moved 516 to be executed at a different machine (e.g., with a lower environmental and/or energy cost). It will be understood that the determinations of energy usage and the remedial actions are taken in real-time, such that specific computations (e.g., applications) or a particular problem with a machine (e.g., a malfunctioning server) are identified and flagged on an ongoing basis (e.g., without waiting for reported energy consumption as approximated from a meter).

In some embodiments, machine 103*a* begins performing the first computation 518 that was offloaded from machine 102*a*. For example, the system offloads one or more computations of a first type, such virtual machine hosting, to a location with a lower environmental and/or energy cost.

In some embodiments, at a second time (t=2), the server 110 recalculates 526 the costs of the machines at the respective locations. In some embodiments, in accordance with a determination that the cost of executing the first computation on machine 103*a* is, at t=2, a higher cost than the cost of executing the first computation on machine 102*a*, the first computation is optionally returned 530 to machine 102*a* (e.g., and machine 102*a* is turned back on 532, if it had been turned off during a high-cost period for machine 102*a*).

In some embodiments, the server 110 (or an administrator 112) takes a remedial action by turning off 524 machine 102*a* (e.g., in accordance with a determination that machine 102*a* satisfies one or more criteria, such as the machine 102*a* is not a server machine), or performing another remedial action (e.g., time-shifting or location-shifting one or more processes executing on machine 102*a*).

In some embodiments, operator 204 sends a request 522 to the server 110 and/or administrator 112 to turn up or down a current amount of load at a respective location. For example, because the server 110 has real-time access to controlling particular computations (e.g., applications) and machines at respective locations, the server 110 is enabled to take action in response to a request from operator 204 to help shift an energy burden at a respective location (e.g., by taking a remedial action, such as offloading or turning off a machine). In some embodiments, in response to request 522, server 110 (or server 108 or administrator 112), sends an instruction to a respective machine 102*a* and/or 103*a* to perform load balancing (e.g., to time-shift or location-shift a current load of the respective machine). In some embodiments, after the load balancing is performed, a report is optionally forwarded (e.g., from machine 102*a* and/or machine 103*a*) to the operator 204 to indicate the actions taken in response to the request 522.

In some embodiments, the server 110 and/or administrator 112, at step 514 (FIG. 5), determine one or more remedial actions to take on a respective machine, based on the determined costs. It will be understood that moving one or more candidate computations to another location, as described herein, is one example of a remedial action that may be taken. In some embodiments, one or more machines are switched off in response to energy grid demand reductions, as indicated by request 522 from the operator 204. In some embodiments, the one or more machines that are selected to be switched off correspond to compute workloads that are non-critical for a customer associated with the machines and could be shut down for a short period of time without material impact to the customer's operations. For example, if the customer is a data center, the administrator 122 (or the customer) uses the consumption information to shift power loads (via shifting computing loads) in response to the consumption reduction request.

In some embodiments, the remedial actions include one or more of: time-shifting data processing (e.g., change a time of execution of a process to be run at a lower-cost time), location shifting of data processing (e.g., from Location A to Location B), turning off a respective machine, transitioning to a less energy intensive process, changing a power plan of a device (e.g., entering energy-saving mode on a device), changing an energy subscription with a power provider (e.g., to a tiered, or non-peak usage plan), or identifying a machine or machines to be decommissioned, replaced, or repaired (hardware or software). In some embodiments, the system described above is used to identify patterns of behavior, on respective machines, that is not efficient (e.g., increases environmental and/or energy costs), such as identifying when machines (e.g., laptops or other client devices) are left on overnight. In some embodiments, the identified machines may be automatically shut down (if configured as such) as a remedial action.

In some embodiments, the server 110 generates one or more reports using the stored power usage and cost data determined using the method described above. In some embodiments, the one or more reports include averages (e.g., average usage) of particular machines or locations of machines over a predetermined time period (e.g., over a day, a week, a month) and optionally includes a trend of the power usage and/or cost. In some embodiments, the reports are used to determine whether locations are meeting compliance standards. In some embodiments, the reports include information for particular machines that tend to consume large amounts of power. For example, an outlier machine that consumes a large amount of power is indicated in the one or more reports to prompt fixing or replacing of the outlier machine.

In some embodiments, the one or more reports are displayed in a user interface (e.g., a dashboard) at a user device (e.g., for administrator 112 to view). In some embodiments, the stored power usage and/or cost data (e.g. the raw data) are provided for display at a client device. In some embodiments, the stored power usage and/or cost data are used to generate a user interface that includes data visualizations (e.g., graphs or other representations of the data) for an administrator to view data for respective machines. In some embodiments, the user interface further includes one or more recommended remedial actions (e.g., for selection by the operator 204 and/or administrator 112), as described below.

As noted above, an electrical grid operator may request that electricity loads be reduced during a certain time period in order to maintain sufficient electricity supply on their grid, to optimize the use of renewable energy sources, and/or to manage electricity pricing. In some embodiments, in response to such a request, operator 204 (or administrator 112), having the knowledge of which machines or which computing processes are consuming electricity, selects one or more remedial actions (e.g., by shifting selected computational workloads to different machines, e.g., geographical shifting, and/or time-shifting computing workloads, e.g., delaying the performance of selected operations) from among the available remedial actions in order to comply with the request from the electrical grid operator, and sends instructions to affected machines 102 in the managed network so as to perform or initiate performance of the selected one or more remedial actions. In some embodiments, operator 204 (or administrator 112) generates a report identifying remedial actions taken so as to comply with the electrical grid operator's request and/or identifying the quantify of power usage shifted as a result of the remedial actions so as to comply with the electrical grip operator's request, and that report is optionally provided (e.g., possibly after review by a human administrator or manager) to the electrical grid operator to demonstrate compliance with the request.

It will be understood that the operations described above as being performed by a respective machine (e.g., server or endpoint) are provided as examples, and that one or more of the operations described above as being performed by server 110 may also be (e.g., in addition to or instead of) performed by a respective endpoint (e.g., machine 102*a* or machine 103*a*). In some embodiments, operations described above as being performed at a respective endpoint may also be performed by, for example, a server of the network (e.g., on a LAN) of the respective endpoint, such as server 108, or may be performed by server 110 or administrator 112. For example, a cost calculation 512, described as being calculated at server 110, may instead be calculated at machine 102*a* or machine 103*a*, and/or may be calculated at a server 108 of the network (e.g., that is on a same LCO as the respective machine, or otherwise connected via LAN to the respective machine).

The foregoing description has been provided with reference to specific embodiments. However, the illustrative discussions above are not intended to be exhaustive or to be limiting to the precise forms disclosed. Many modifications and variations are possible in view of the above teachings. The embodiments were chosen and described in order to best explain the principles disclosed and their practical applications, to thereby enable others to best utilize the disclosure and various embodiments with various modifications as are suited to the particular use contemplated.

What is claimed is:

1. A server system, comprising:

one or more communication interfaces for communicatively coupling the server system to a distributed system of respective machines in a collection of machines via one or more linear communication orbits;

one or more processors; and memory storing one or more programs for execution by the one or more processors, the one or more programs including instructions for:

acquiring, for each of a sequence of reporting time periods, resource usage information for each of a plurality of respective machines in the collection of machines via the one or more linear communication orbits, wherein:

at each particular machine of a plurality of machines located on a respective linear communication orbit of the one or more linear communication orbits, the resource usage information for the particular machine is sent, via the respective linear communication orbit, to a neighbor machine of the particular machine on the respective linear communication orbit, and at another machine of the plurality of machines located on the respective linear communication orbit, the resource usage information from the plurality of machines is forwarded to the server system, wherein the machines in each of the one or more linear communication orbits are linked by a respective communication channel between each pair of adjacent machines in an ordered sequence according to respective unique identifiers of each machine in that linear communication orbit, and for any given one of the reporting time periods, the resource usage information is acquired, via the one or more linear communication orbits, within a predefined amount of time of the end of the given time period so that the server system is able to respond in real-time or near real-time;

determining, for each of the respective machines for each analysis time period in a sequence of analysis time periods, power or environmental cost information associated with the respective machine and the acquired resource usage information for one or more of the sequence of reporting time periods;

based on the determined power or environmental cost information, determining one or more remedial actions to be performed for reducing resource usage associated with operations performed by one or more corresponding machines of the plurality of respective machines; and transmitting one or more instructions to the one or more corresponding machines to perform the one or more remedial actions determined based on the power or environmental cost information, wherein each corresponding machine executes a respective program or module to receive an instruction of the one or more instructions and responsively perform a corresponding remedial action of the one or more remedial actions.

2. The server system of claim 1, wherein the resource usage information comprises power consumption.

3. The server system of claim 1, wherein acquiring the resource usage information for a respective machine of the plurality of respective machines, for a respective reporting time period, comprises determining amounts of time each component of a plurality of components of the respective machine is in each of a plurality of states corresponding to the component during the respective reporting time period, using the determined amounts of time to determine power usage by each of the components of the respective machine during the respective reporting time period, and aggregating the determined power usage by each of the components of the respective machine during the respective reporting time period to determine power usage of the respective machine during the respective reporting time period.

4. The server system of claim 1, including, storing the power or environmental cost information at the server system.

5. The server system of claim 1, wherein the one or more remedial actions includes one or more of: time-shifting data processing, location shifting of data processing, turning off a respective machine, transitioning to a less energy intensive process, changing a power plan of a device, and changing an energy subscription with a power provider.

6. The server system of claim 1, wherein causing the remedial action operation to be executed includes receiving a selection of a candidate remedial operation from a user.

7. The server system of claim 1, wherein determining the one or more remedial actions to be performed is based on a request received from an external operator.

8. The server system of claim 1, wherein the one or more remedial actions to be performed are selected automatically based on a request received from an energy provider.

9. The server system of claim 1, further comprising:

presenting a plurality of candidate remedial actions, wherein the plurality of candidate remedial actions include one or more selectable remedial actions for reducing environmental costs associated with operations performed by the plurality of respective machines; and in response to receiving user selection of the one or more remedial actions transmitting the one or more instructions to the one or more corresponding machines to perform the one or more remedial actions.

10. The server system of claim 1, further comprising generating a report based at least in part on the determined power or environmental cost information.

11. The server system of claim 10, wherein the report that includes information for the determined power or environmental cost information includes an hourly, daily, and/or monthly average of the power or environmental cost information.

12. The server system of claim 10, wherein the report that includes information for the determined power or environmental cost information includes one or more identifiers for one or more machines in the respective machines that satisfy inefficiency criteria.

13. A distributed system, comprising:

a server system; and

N respective machines in a collection of machines on one or more linear communication orbits, where N is an integer greater than 2, wherein each respective machine of the N respective machines is configured to perform operations including:

during each of a sequence of reporting time periods, collecting and locally storing resource usage information, the resource usage information for a respective time period in the sequence of reporting time periods comprising information identifying resource usage by the respective machine during a respective time period, including power consumption during the respective time period and one or more of processes executed, CPU usage or memory usage during the respective time period;

reporting, via the one or more linear communication orbits, the collected resource usage information to the server system, including:

at each particular machine of a plurality of machines located on a respective linear communication orbit of the one or more linear communication orbits, sending, via the respective linear communication orbit, the resource usage information for the particular machine to a neighbor machine of the particular machine on the respective linear communication orbit; and at another machine of the plurality of machines located on the respective linear communication orbit, forwarding the resource usage information from the plurality of machines to the server system, wherein the machines in each of the one or more linear communication orbits are linked by a respective communication channel between each pair of adjacent machines in an ordered sequence according to respective unique identifiers of each machine in that linear communication orbit, and for any given one of the reporting time periods, the resource usage information is acquired, via the one or more linear communication orbits, within a predefined amount of time of the end of the given time period so that the server system is able to respond in real-time or near real-time;

at the server system or at the N respective machines:

storing environmental cost information corresponding to each of the N respective machines, the environmental cost information for a respective machine including one or more of power cost information, with respect to the cost of power consumed by the respective machine, and environmental impact information based on a source of the power consumed by the respective machine; and determining, for each of the N respective machines for each analysis time period in a sequence of analysis time periods, power or environmental cost information based on the stored environmental cost information and the collected resource usage information for one or more of the sequence of reporting time periods; and at the server system, performing operations including:

based on the determined power or environmental cost information, presenting a plurality of candidate remedial actions, wherein the plurality of candidate remedial actions include two or more user-selectable remedial actions for reducing environmental costs associated with operations performed by one or more corresponding machines of the N respective machines; and in response to receiving user selection of a respective remedial action, transmitting one or more instructions to the one or more corresponding machines to perform the respective remedial action determined based on the power or environmental cost information, wherein each corresponding machine executes a respective program or module to receive the one or more instructions and responsively perform the respective remedial action.

14. The distributed system of claim 13, including, storing environmental cost information corresponding to each of the respective machines, the environmental cost information for a respective machine of the N respective machines, the environmental cost information including one or more of: power cost information, with respect to the cost of power consumed by the respective machine, and environmental impact information based on a source of the power consumed by the respective machine.

15. The distributed system of claim 13, including determining the power or environmental cost information at the server system.

16. The distributed system of claim 13, including determining the power or environmental cost information at each of the N respective machines.

17. The distributed system of claim 13, wherein the plurality of candidate remedial actions includes one or more of: time-shifting data processing, location shifting of data processing, turning off the corresponding machine of the one or more corresponding machines, transitioning to a less energy intensive process, changing a power plan of a device, and changing an energy subscription with a power provider.

18. The distributed system of claim 13, including generating a report that includes information for the determined power or environmental cost information.

19. The distributed system of claim 18, wherein the report that includes information for the determined power or environmental cost information includes an hourly, daily, and/or monthly average of the power or environmental cost information.

20. The distributed system of claim 18, wherein the report that includes information for the determined power or environmental cost information includes one or more identifiers for one or more machines of the N respective machines that satisfy inefficiency criteria.

21. The distributed system of claim 13, wherein the sequence of reporting time periods for a first machine of the N respective machines comprises a different reporting time period than the reporting time period for a second machine of the N respective machines.

22. The distributed system of claim 13, wherein reporting, via the one or more linear communication orbits, the collected resource usage information to the server system includes:

at each machine in a subset of the N respective machines located on the respective linear communication orbit, aggregating resource usage information received by the machine from a neighbor machine located on the respective linear communication orbit with resource usage information for the machine and forwarding the aggregated resource usage information to another neighbor machine located on the respective linear communication orbit, wherein a last machine in the subset of the N respective machines sends to the server system aggregated resource usage information for multiple machines of the plurality of machines.

23. The distributed system of claim 13, wherein, at each machine in a subset of the N respective machines located on the respective linear communication orbit, the resource usage information received by the machine from a neighbor machine located on the respective linear communication orbit is aggregated with resource usage information for the machine and the aggregated resource usage information is forwarded to another neighbor machine located on the respective linear communication orbit, wherein a last machine in the subset of the N respective machines sends to the server system aggregated resource usage information for multiple machines of the N respective machines.

* * * * *